United States Patent
Nakahara

(10) Patent No.: US 10,587,778 B2
(45) Date of Patent: Mar. 10, 2020

(54) PRINTER CONTROLLER, COLOR MANAGEMENT SYSTEM, AND NON-TRANSITORY COMPUTER-READABLE RECORDING MEDIUM STORING PROGRAMS

(71) Applicant: Konica Minolta, Inc., Tokyo (JP)

(72) Inventor: Hiroki Nakahara, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/927,185

(22) Filed: Mar. 21, 2018

(65) Prior Publication Data
US 2018/0278806 A1 Sep. 27, 2018

(30) Foreign Application Priority Data
Mar. 23, 2017 (JP) ................................ 2017-057349

(51) Int. Cl.
*H04N 1/60* (2006.01)
(52) U.S. Cl.
CPC ......... *H04N 1/6027* (2013.01); *H04N 1/6008* (2013.01); *H04N 1/6033* (2013.01); *H04N 1/6058* (2013.01); *H04N 2201/0094* (2013.01)
(58) Field of Classification Search
CPC .. H04N 1/6027; H04N 1/6008; H04N 1/6058; H04N 1/6033; H04N 2201/0094
USPC ...................................................... 358/1.15
See application file for complete search history.

(56) References Cited

U.S. PATENT DOCUMENTS

| 6,008,907 A | * | 12/1999 | Vigneau | H04N 1/6033 348/179 |
| 2001/0038459 A1 | * | 11/2001 | Mahy | H04N 1/6033 358/1.9 |
| 2003/0234943 A1 | | 12/2003 | Van Bael | |
| 2005/0190390 A1 | * | 9/2005 | Yamada | H04N 1/6058 358/1.9 |
| 2005/0281459 A1 | | 12/2005 | Bala et al. | |
| 2012/0133960 A1 | | 5/2012 | Henderson | |

FOREIGN PATENT DOCUMENTS

| JP | 2008-301351 A | 12/2008 |
| JP | 2015-27016 A | 2/2015 |

OTHER PUBLICATIONS

Extended European Search Report issued in corresponding European Application No. 18163316.5 dated Jul. 30, 2018 (10 pages).
Office Action issued in corresponding Chinese Patent Application No. 201810241119.6 dated Jun. 5, 2019, with translation (22 pages).

* cited by examiner

*Primary Examiner* — Tammy Paige Goddard
*Assistant Examiner* — Darryl V Dottin
(74) *Attorney, Agent, or Firm* — Osha Liang LLP

(57) ABSTRACT

A scanner profile previously retains process color components (such as CMYK) used for profile generation. Grid points are selected from a scanner profile corresponding to the process color components (CMYK) for any output device value of an input image. An output device value for color patch is acquired while the output device value for color patch results from adding a color (R) except the process color components (CMYK) for any output device value to the CMYK process color components retained at the selected grid points. A color patch (chart image) is generated based on the output device value for color patch.

15 Claims, 18 Drawing Sheets

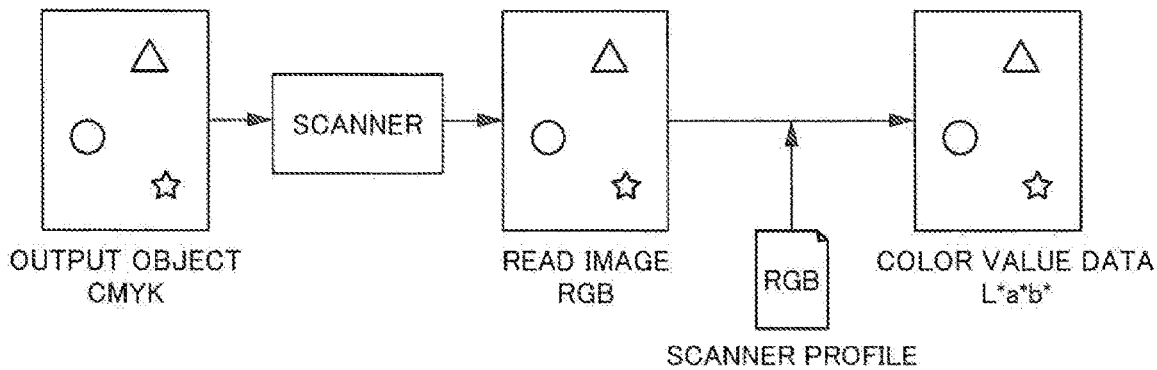
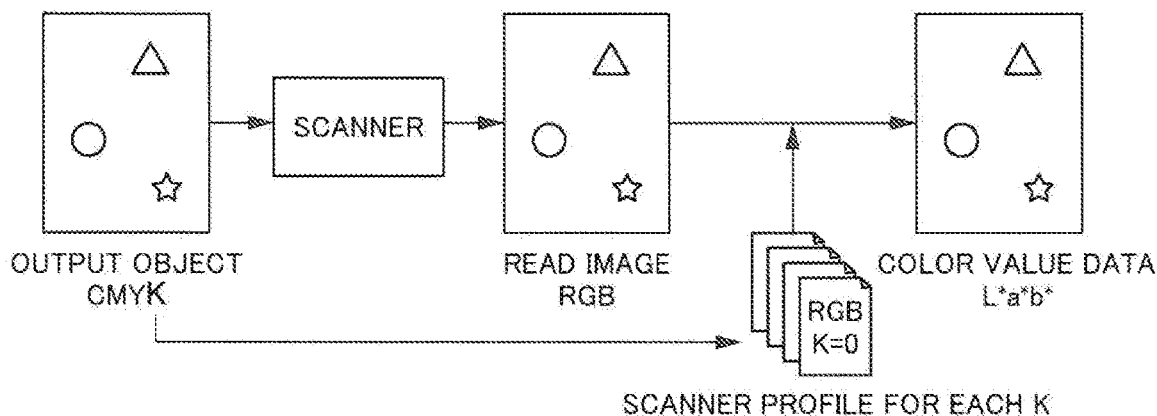
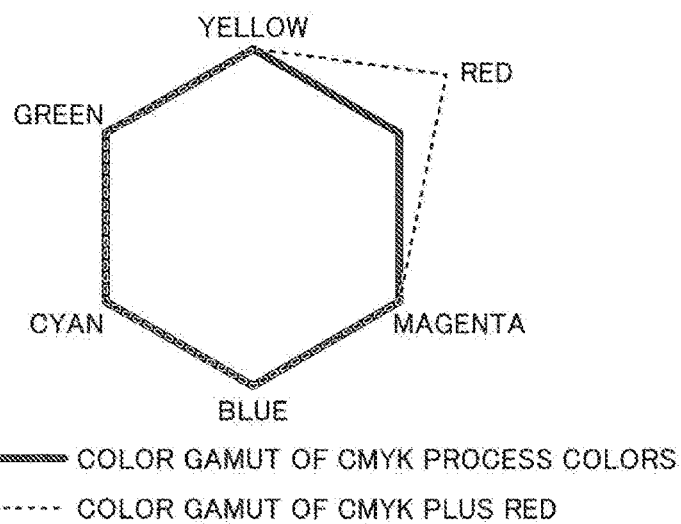

SP

| RGB | L*a*b* |
|---|---|
| 0,0,0 | 0,0,0 |
| 0,0,10 | 0,0,-10 |
| 0,0,20 | 0,0,-20 |
| ⋮ | ⋮ |

PP

| L*a*b* | CMYK |
|---|---|
| 92,0,0 | 0,0,0,0 |
| 10,-7,-2 | 10,0,0,0 |
| 20,-14,-4 | 20,0,0,0 |
| ⋮ | ⋮ |

| IMAGE REGION | CMYKR VALUE | AVAILABILITY OF R COMPONENT |
|---|---|---|
| Obj1(TRIANGLE) | 100,100,0,0,0 | N/A |
| Obj2(CIRCLE) | 0,20,20,0,80 | AVAILABLE |
| Obj3(STAR) | 0,0,100,0,0 | N/A |
| OTHER (WHITE BASE) | 0,0,0,0,0 | N/A |

PRINTER CONTROLLER, COLOR MANAGEMENT SYSTEM, AND NON-TRANSITORY COMPUTER-READABLE RECORDING MEDIUM STORING PROGRAMS

CROSS-REFERENCE TO RELATED APPLICATIONS

The entire disclosure of Japanese Patent Application No. 2017-057349, filed on Mar. 23, 2017, is incorporated herein by reference in its entirety.

BACKGROUND

Technical Field

The present invention relates to a printer controller, a color management system, and a non-transitory computer-readable recording medium storing programs to manage scanner profiles.

Description of the Related Art

A scanner irradiates the light to a read object and acquires an input device value by using a specific filter (such as RGB) for the reflected light from the read object. The scanner provides a higher resolution than a colorimeter. The scanner is therefore capable of reading images other than charts output from a printer and is expected to practice color management of images other than charts. The printer generally represents various colors by varying compounding ratios of four process colors (reference colors) such as cyan (C), magenta (M), yellow (Y), and black (K). Generally, CMYK is referred to as a reference color.

The color management requires a device-independent color value. However, the scanner alone cannot acquire a color value. The color management therefore uses a scanner profile (input color conversion table). Generally, the scanner profile provides a correspondence table between an input device value (such as RGB) for the scanner and a color value (L*a*b* or XYZ). Each one of correspondence relationships is referred to as a "grid point." As illustrated in FIG. 1, the scanner reads an output object where an image (CMYK) is drawn. The scanner acquires color value data by converting an input device value (RGB) of a pixel configuring a read image into color values using the scanner profile.

It is generally known that reading an output object from a CMYK-compatible color printer fails in correct conversion into color values due to the presence or absence of the K component or the amount of the same. For this reason, a scanner profile is generated for each K ingredient amount (gradation value). As illustrated in FIG. 2, a proper scanner profile is applied to a read image corresponding to the K ingredient amount of the read image.

A printer using the fifth color (referred to as a specific color) in addition to the CMYK process colors is prone to the issue similar to K in terms of the fifth color. The above-mentioned technology, if used for the fifth color, requires generating a scanner profile for each ingredient amount of the fifth color in addition to the scanner profile for each K ingredient amount. A large amount of materials (such as toner and paper) is consumed.

For example, patent literature 1 proposes the technology that generates a chart by selecting a frequently used color as a color patch from pixels of image data and generates a profile corresponding to only the part needed for image output.

Patent literature 2 describes the spot color correction method that outputs a chart of grid points in a printer profile corresponding to a color value of a spot color in order to correct the spot color represented by using the CMYK process colors. This spot color correction method measures the chart and generates a correction table for spot colors.

CITATION LIST

Patent Literatures

Patent Literature 1: JP 2015-27016 A
Patent Literature 2: JP 2008-301351 A

SUMMARY

The scanner profile requires at least four grid points corresponding to pixels to be measured and an output device value and necessitates estimating a color patch corresponding to the four grid points. However, the technology described in patent literature 1 considers only printer profiles and is inapplicable to scanner profiles. The printer profile is provided as a correspondence table between an output device value (such as CMYK) for the printer and a color value (L*a*b* or XYZ).

The technology described in patent literature 2 only considers CMYK. The technology presupposes the presence of grid points and is inapplicable to a color gamut void of a grid point.

The present invention has been made in consideration of the foregoing. One or more embodiments of the invention generate a scanner profile applicable to a color component other than process colors provided for a printer while greatly reducing consumption of materials.

According to one or more embodiments of the present invention, a printer controller (e.g., information processor) includes: a printer profile that registers correspondence relationship between at least a CMYK color space and a device-independent color space; and a scanner profile that registers correspondence relationship between the device-independent color space and an RGB color space and retains a CMYK output device value at a grid point. The printer controller further includes: an input device value estimator that uses the printer profile and the scanner profile to estimate an RGB input device value corresponding to the CMYK output device value in a pixel containing a color other than CMYK for input image data; a grid point selector that selects a plurality of grid points capable of interpolating the estimated input device value from the scanner profile; an output device value acquirer that acquires an output device value for color patch by adding information about a color except CMYK for the pixel to a CMYK output device value retained at each of the grid points selected by the grid point selector from the scanner profile; and a chart generator that generates a chart image including a color patch based on the output device value for color patch at each grid point.

BRIEF DESCRIPTION OF THE DRAWINGS

The advantages and features provided by one or more embodiments of the invention will become more fully understood from the detailed description given herein below and the appended drawings which are given by way of illustration only, and thus are not intended as a definition of the limits of the present invention:

FIG. 1 is an explanatory diagram illustrating a flow of color value data acquisition using a prior-art scanner profile according to one or more embodiments of the present invention;

FIG. 2 is an explanatory diagram illustrating a flow of color value data acquisition using a prior-art scanner profile for each K according to one or more embodiments of the present invention;

FIG. 3 is an explanatory diagram illustrating a color gamut of CMYK process colors and red according to one or more embodiments of the present invention;

DETAILED DESCRIPTION OF EMBODIMENTS

Figure 4:
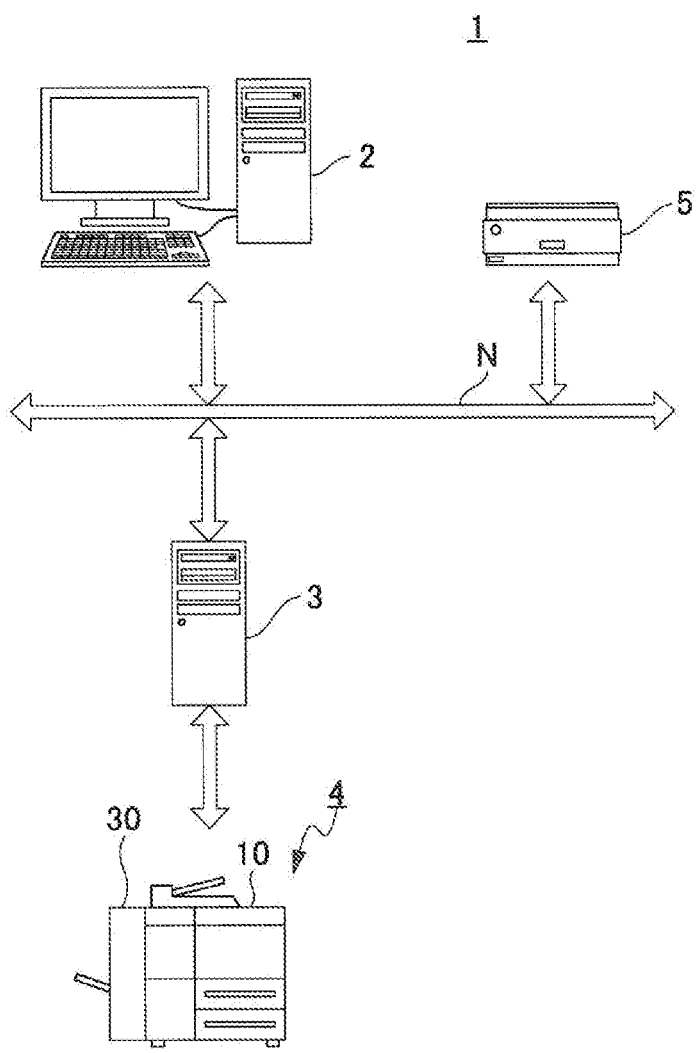
FIG. 4 is a system configuration diagram illustrating a color management system according to one or more embodiments of the present invention.

Hereinafter, embodiments of the present invention will be described with reference to the accompanying drawings. In the accompanying drawings, constituent elements having substantially the same functions or configurations are designated by the same reference numerals and a duplicate description is omitted. The accompanying drawings provide specific embodiments and implementation examples compliant with the principle of the present invention for the purpose of understanding the present invention but are definitely not used to interpret the present invention to a limited extent.

An overview of one or more embodiments of the present invention will be first described. FIG. 3 illustrates the color gamut of CMYK process colors and red according to one or more embodiments of the present invention.

In FIG. 3, a solid line represents the color gamut of CMYK process colors. Suppose the fifth color is red (R). The printer color gamut then expands by the color gamut of red positioned approximately intermediate between yellow and magenta as represented by a broken line in comparison with the color gamut of CMYK process colors. In this case, the color gamut near cyan, green, or blue is unlikely to be used to represent the color gamut near red even if the scanner profile for the fifth color is generated for all the color gamuts.

For this reason, a scanner profile corresponding to red (R) as the fifth color is generated only for a necessary part. A general technique is to generate a chart covering all color gamuts and generate a scanner profile for all the color gamuts by scanning the chart and measuring the intensity of color. However, partially generating a scanner profile (corresponding to CMYKR in this example) requires generating a grid point capable of interpolation in the input color space (RGB) corresponding to any output device value (CMYKR) and estimating output device values (C'M'Y'K'R') in order to generate the grid point.

One or more embodiments of the present invention use the scanner profile to beforehand retain process color components (such as CMYK) used to generate the profile and selects a grid point in the scanner profile corresponding to the process color component (CMYK) for any output device value in an input image. An output device value (output device value for chart generation) for color patch is then acquired on condition that the output device value results from adding the color (R) excluding the process color components (CMYK) for any output device value to the above-mentioned CMYK process color components retained in the selected grid point. A color patch (chart image) is generated based on the output device value for color patch. Embodiments of the present invention will be described.

Overall System Configuration

FIG. 4 is a system configuration diagram illustrating a color management system according to one or more embodiments of the invention.

A color management system 1 includes a client terminal 2, a printer controller 3 (e.g., an information processor), an image generation system 4, and a colorimeter 5. The image generation system 4 includes an image generator body 10 and an inspection unit 30. As an intranet, the client terminal 2, the printer controller 3, the image generator body 10, and the colorimeter 5 are communicably interconnected via network N. Network N is provided as LAN compliant with the standard such as Ethernet (registered trademark), for example. The image generation system 4 (image generator body 10) is connected to network N via the printer controller 3. However, the image generation system 4 may be directly connected to network N.

The client terminal 2 transmits a print job to the printer controller 3 via network N. The print job instructs print output based on input manipulation by a user. The print job is provided as data generated by the client terminal 2 based on PDL (Page Description Language), for example, and contains output setting or input data. The client terminal 2 is available as a personal computer (hereinafter also acronymized as "PC") or a mobile terminal, for example.

The printer controller 3 allows the image generator body 10 included in the image generation system 4 to execute print output based on the print job. The printer controller 3 receives the print job from the client terminal 2 via network N and executes a rasterization process (hereinafter also referred to as an "RIP process") on input data extracted from the received print job. The printer controller 3 transfers the print job to the image generator body 10 while the print job contains the RIP-processed input data (raster image) and a job ticket.

The image generator body 10 accepts the print job from the printer controller 3 and forms an image on the paper. In the present specification, a process to form an image on the paper is referred to as a "print process." For example, the IEEE1394 standard or the parallel communication is used to transfer the print job from the printer controller 3 to the image generator body 10, for example. In FIG. 4, the printer controller 3 is separated from the image generator body 10. However, the printer controller 3 may be built in the image generator body 10.

The color management system 1 may use a recording medium such as USB (Universal Serial Bus) memory without using network N to interchange data between apparatuses.

Internal Configuration of the Image Generation System

Figure 5:
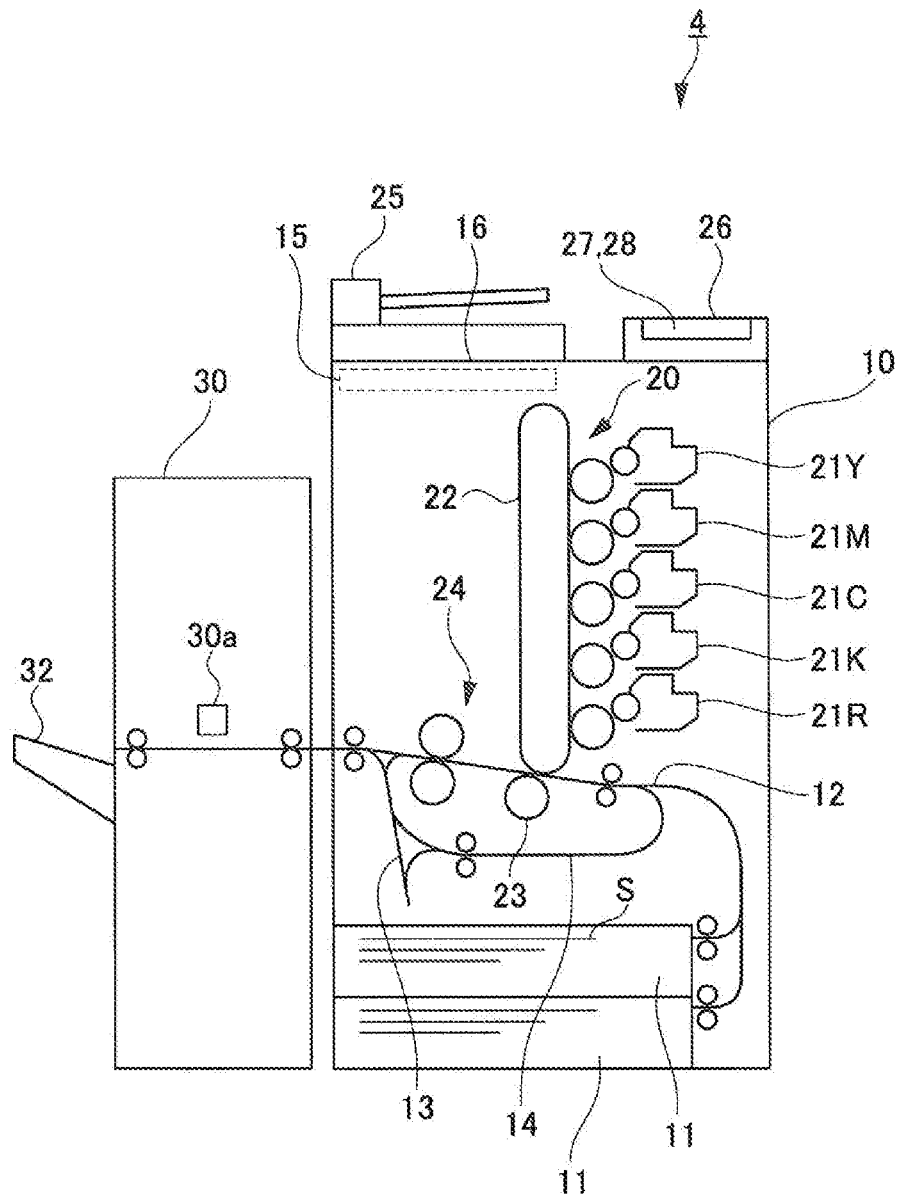
FIG. 5 is a schematic sectional view illustrating an internal configuration of an image generation system including an inspection unit according to one or more embodiments of the present invention.

FIG. 5 is a schematic sectional view illustrating an internal configuration of the image generation system 4 including the inspection unit 30 according to one or more embodiments of the present invention. As illustrated in FIG. 5, the image generation system 4 includes the image generator body 10 and the inspection unit 30 that are connected serially.

Image Generator Body

The image generator body 10 employs the xerographic technique that uses static electricity to generate images. The image generator body 10 is provided as a tandem-type color image generator that overlaps toner images in four colors such as yellow (Y), magenta (M), cyan (C), and black (K), for example. The image generator body 10 may be provided as an image generator that forms images based on a technique other than the xerographic technique.

The image generator body 10 includes a plurality of paper trays 11, a scanner 15, an image generator 20, an auto document feeder (ADF) 25, and a manipulation display panel 26. The image generator body 10 includes a transport path 12 formed to transport paper sheet S supplied from the paper tray 11. The transport path 12 is provided with a plurality of rollers (transport rollers) to transport paper sheet S.

After a document is placed on a document feeding tray, the auto document feeder 25 allows a plurality of unshown rollers and transport drums to transport the document one sheet at a time to a read position for the scanner 15, namely, to the top face of a platen glass 16 (document tray). The auto document feeder 25 uses a document eject roller to eject the transported document to a document eject tray of the auto document feeder 25.

The image generator 20 includes an image formation unit 21R to form toner images in R (red) as a specific color in addition to the four image formation units 21Y, 21M, 21C, and 21K to form toner images in the CMYK process colors. Each image formation unit includes a charger, an exposer such as a laser light source, a developer, and a photoreceptor. The image generator 20 includes an intermediate transfer belt 22, a secondary transferrer 23, and a fixing portion 24. Images are formed on the photoreceptors of image formation units 21Y, 21M, 21C, 21K, and 21R and are transferred to the intermediate transfer belt 22 and the secondary transferrer 23. The fixing portion 24 is provided downstream of the paper transport direction for the secondary transferrer 23. This example does not limit the specific color and placement of the image formation units 21Y, 21M, 21C, and 21K and the image formation unit for the specific color (image formation sequence).

The transport path 12 extends downstream of the paper transport direction for the fixing portion 24 and is connected to the transport path of the inspection unit 30. The transport path 12 connects with a reverse transport path 14 that branches downstream of the fixing portion 24 and joins the transport path 12 upstream of the secondary transferrer 23. The reverse transport path 14 is provided with a reverser 13 that reverses the top face and the bottom face of paper sheet S. The reverser 13 reverses paper sheet S transported from the fixing portion 24 and transports paper sheet S through the reverse transport path 14 to the transport path 12 upstream of the secondary transferrer 23. The reverser 13 is also capable of returning reversed paper sheet S to the transport path 12 downstream of the fixing portion 24 and directly transporting paper sheet S to the inspection unit 30.

The manipulation display panel 26 is installed at the top of the image generator body 10. The manipulation display panel 26 includes a displayer 27 and a manipulator 28. The displayer 27 displays information. The manipulator 28 is used to start an image formation job. The displayer 27 uses an LCD (Liquid Crystal Display) panel, for example. The manipulator 28 uses a touch panel capable of input based on touch interactions. The LCD panel of the displayer 27 is overlaid with the touch panel. The manipulator 28 can include a mouse, a keyboard, or a tablet to be configured independently of the displayer 27.

In image formation mode, the image generator body 10 electrically charges the photoreceptors included in the image formation units 21Y, 21M, 21C, 21K, and 21R and exposes the surface of the photoreceptor corresponding to a document image to form an electrostatic latent image on the photoreceptor. The developer is used to transfer toners to electrostatic latent images on the photoreceptors corresponding to yellow, magenta, cyan, black and red to form toner images in the respective colors. The toner images formed on the photoreceptors corresponding to yellow, magenta, cyan, black and red are primarily transferred to the surface of the rotatively driven intermediate transfer belt 22.

The secondary transferrer 23 (secondary transfer roller) secondarily transfers the toner images in the respective colors primarily transferred to the intermediate transfer belt 22 to paper sheet S supplied from the paper tray 11. The toner images in the respective colors on the intermediate transfer belt 22 are secondarily transferred to paper sheet S to form a color image. The image generator body 10 transports paper sheet S including the colored toner images formed thereon to the fixing portion 24.

The fixing portion 24 executes a fixing process on paper sheet S that is supplied from the image generator body 10 and includes the colored toner image formed thereon. The fixing portion 24 includes an upper fixing roller and a lower fixing roller as fixing members, for example. The upper fixing roller and the lower fixing roller are placed so as to be pressed to each other. A fixing nipper is formed as a crimper made of the upper fixing roller and the lower fixing roller. The fixing portion 24 presses and heats paper sheet S transported to the fixing nipper and fixes the transferred toner image to paper sheet S. The fixing portion 24 completes the fixing process on paper sheet S that is then transported to the inspection unit 30.

Inspection Unit

The inspection unit 30 includes a scanner 30a (exemplifying an image reader) that reads an image formed on paper sheet S transported from the image generator body 10. The scanner 30a is placed above the transport path to transport paper sheet S in the inspection unit 30 and reads an image (output image) formed on the top face of the transported paper sheet S. The scanner 30a uses serial communication via a dedicated line to output data (read image data) read from the output image on paper sheet S to the printer controller 3.

The scanner 30a is available as a line sensor or an image sensor. The line sensor includes a light emitting member and a plurality of photoelectric conversion elements that are placed in the paper width direction (orthogonal to the paper transport direction) at a predetermined interval. The image sensor includes photoelectric conversion elements placed in a matrix. Each photoelectric conversion element outputs a signal corresponding to the intensity of light that is emitted from a light source and reflects off the paper surface. The line sensor and the image sensor are available as a CCD-type sensor or a CMOS-type (including MOS-type) sensor.

A second scanner may be placed below the transport path and may read an image (output image) formed on the bottom face of transported paper sheet S. This configuration enables one pass (single operation) to detect output images on the top face and the bottom face of paper sheet S.

The configuration of the image generation system 4 is not limited to the example in FIG. 4. The function of the inspection unit 30 may be included in the image generator body 10. For example, the scanner 30a may be placed downstream of the fixing portion 24 of the image generator body 10.

Control System for Each Unit

Figure 6:
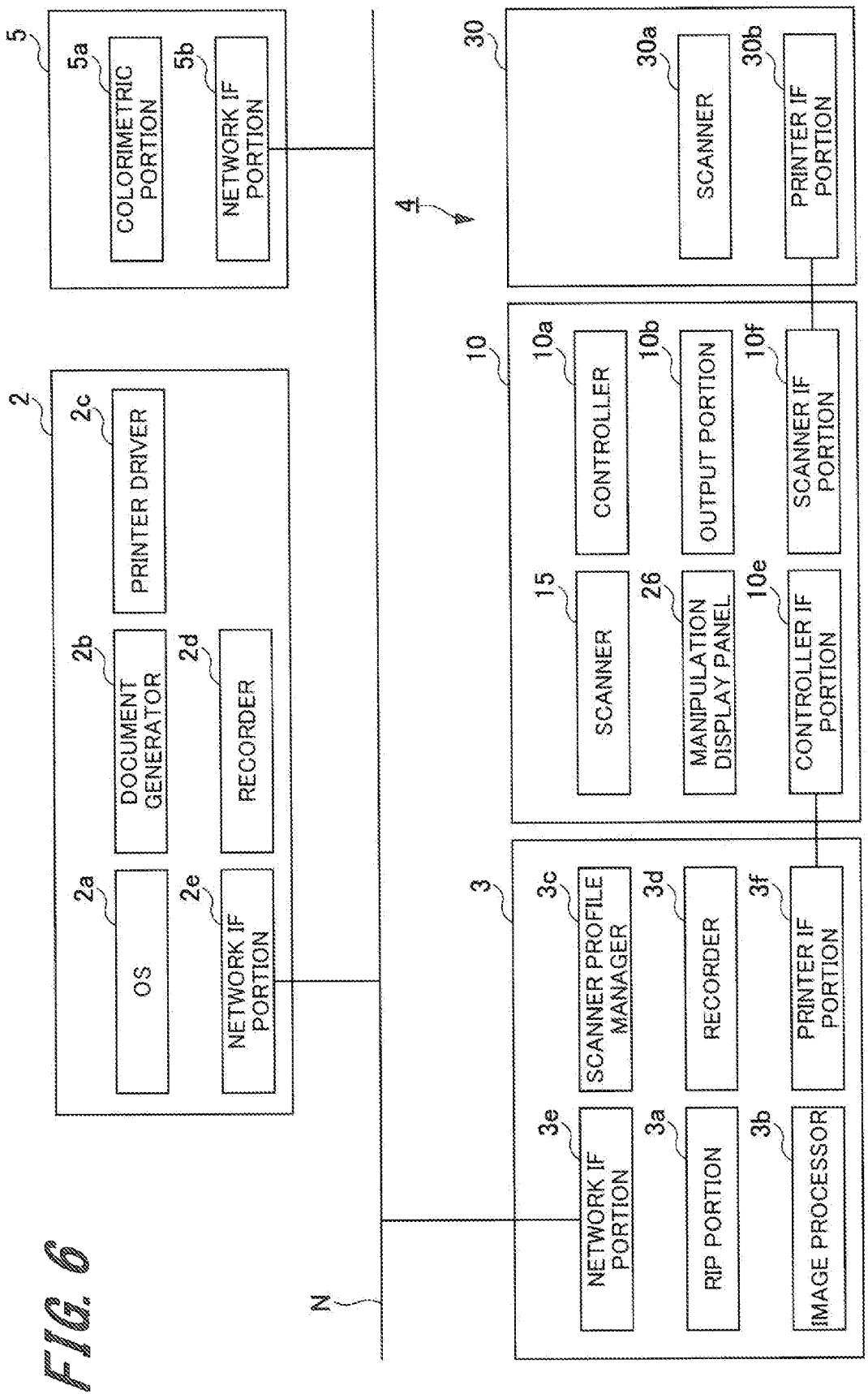
FIG. 6 is a block diagram illustrating a control system for units configuring the color management system according to one or more embodiments of the present invention.

FIG. 6 is a block diagram illustrating a control system for units configuring the color management system 1 according to one or more embodiments of the present invention.

Client Terminal

The client terminal 2 includes an OS (Operating System) 2a, a document generator 2b, a printer driver 2c, a storage 2d, and a network IF portion 2e.

The document generator 2b is provided as software (application) that generates a document (print data) based on a user instruction. The document generator 2b may be available as an application such as graphic drawing software, a web browser, or a mailer.

The printer driver 2c provides a printout setup screen as a user interface (UI) or converts a document directed from the OS 2a or the document generator 2b into data the image generator body 10 can interpret. The printer driver 2c reflects the printout setup on print data from the document generator 2b and converts the print data into a language, namely, Page Description Language (PDL) identifiable on the image generator body 10 that executes printout (to generate drawing data) to be output. The image generator body 10 can identify languages such as PCL and PostScript. The printer driver 2c includes a function of automatically or manually correcting color gradations of print data.

Figures 7, 8:
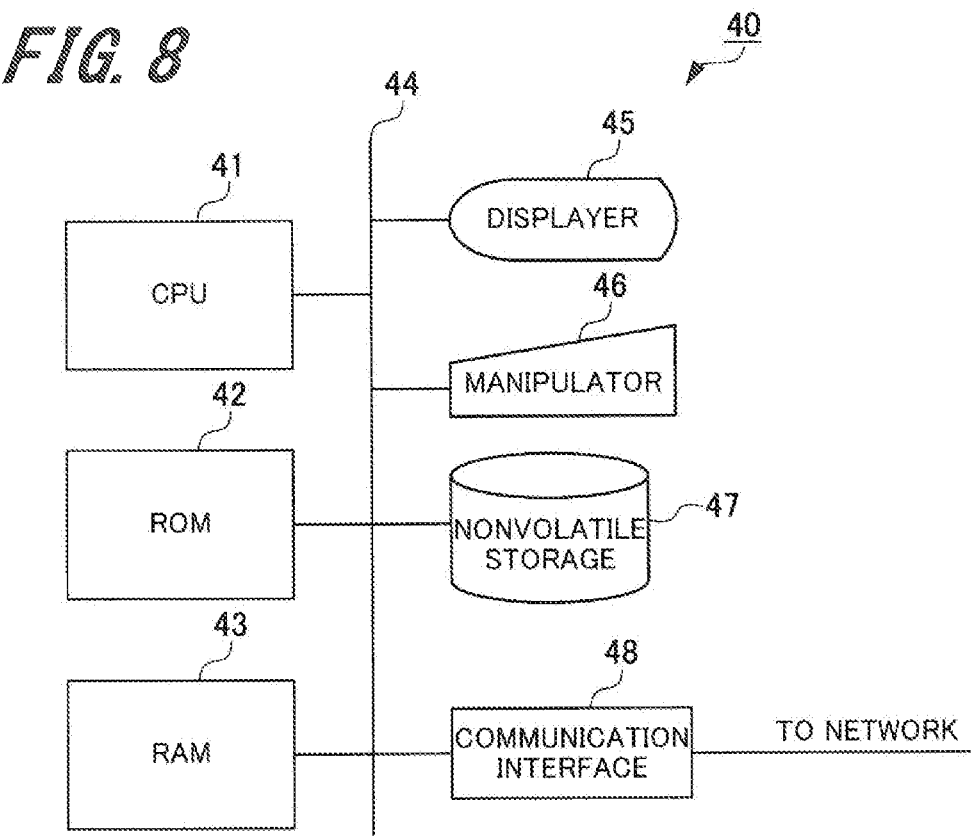
FIG. 7 is an explanatory diagram illustrating a scanner profile and a printer profile according to one or more embodiments of the present invention.
FIG. 8 is a block diagram illustrating a hardware configuration of a computer included in each unit according to one or more embodiments of the present invention.

The storage 2d is provided as a nonvolatile storage device and corresponds to a nonvolatile storage 47 in FIG. 8 to be described, for example.

The network IF portion 2e connects to network N to communicate with other units. The network IF portion 2e transmits a print job to the printer controller 3 via network N, for example.

Printer Controller

The printer controller 3 includes an RIP portion 3a, an image processor 3b, a scanner profile processor 3c, a storage 3d, a network IF portion 3e, and a printer IF portion 3f.

The RIP portion 3a executes a process that translates PDL drawing data and develops it into raster image data. A raster image is provided as data expressed as a collection of colored dots and represents a type of bit map images.

The image processor 3b executes a process that analyzes a method of processing received PDL drawing data or analyzes various types of image generation instructions.

The scanner profile processor 3c generates a chart image for scanner profile generation or generates and manages a scanner profile.

The storage 3d is provided as a nonvolatile storage device that saves raster image data, a printer profile, and a scanner profile. For example, the storage 3d saves scanner profile SP and printer profile PP as illustrated in FIG. 7.

Scanner profile SP registers the correspondence relationship between an input device color space and a device-independent color space. For example, the input device color space registers an input device value (such as RGB) detected by the inspection unit 30 (scanner 30a). The device-independent color space registers a color value (such as L*a*b* or XYZ). Spectroscopic data is used to calculate a color value. The measurement requires a dedicated measuring device referred to as a colorimeter. The grid point in scanner profile SP retains an output device value representing a process color (such as CMYK) for the image generator body 10 used to generate scanner profile SP.

Printer profile PP registers the correspondence relationship between an output device color space and the device-independent color space. For example, the output device color space registers an output device value (such as CMYK) representing a process color for the image generator body 10. The device-independent color space registers a color value (such as L*a*b* or XYZ). Printer profile PP just needs to register at least an output device value (such as CMYK) representing a process color for the image generator body 10 and may include an output device value representing a color (such as R) other than the process color.

The network IF portion 3e connects to network N and communicates with the other units. For example, the network IF portion 3e receives a print job from the client terminal 2 or receives a colorimetry result from the colorimeter 5.

The printer IF portion 3f communicates with the image generator body 10, outputs a request to transmit machine states to the image generator body 10, or outputs a print job containing raster image data. A dedicated line is used for connection between the printer controller 3 and the image generator body 10, for example. The IEEE1394 standard or the parallel communication is used for communication between the printer controller 3 and the image generator body 10.

Image Generator Body

The image generator body 10 is provided as an image generator that executes a print process based on instructions from the printer controller 3. The image generator body 10 includes a controller 10a, an output portion 10b, a scanner 15, a manipulation display panel 26, a controller IF portion 10e, and a scanner IF portion 10f.

The controller 10a controls parts of the image generator body 10 in accordance with manipulation signals output from the manipulation display panel 26.

The output portion 10b is also referred to as a printer engine and executes a print process (image formation) in accordance with print instructions from the controller 10a. The output portion 10b corresponds to the image generator 20 (such as the image formation units 21Y, 21M, 21C, 21K, and 21R, the intermediate transfer belt 22, the secondary transferrer 23, and the fixing portion 24) illustrated in FIG. 5.

The scanner 15 scans a read object placed on the platen glass 16 in accordance with an image read instruction from the controller 10a.

The manipulation display panel 26 generates a manipulation signal corresponding to input manipulation of a user and outputs the manipulation signal to the controller 10a.

The controller IF portion 10e communicates with the printer controller 3 to return machine states to the printer controller 3 or receive a print job containing raster image data.

The scanner IF portion 10f communicates with the inspection unit 30 to transmit an image read command to the inspection unit 30 or receive a read image from the inspection unit 30. A dedicated line is used for connection between the image generator body 10 and the scanner IF portion 10f, for example. The serial communication is used for data transfer between the image generator body 10 and the scanner IF portion 10f.

Inspection Unit

The inspection unit 30 includes a scanner 30a and a printer IF portion 30b.

The scanner 30a (exemplifying an input device value acquirer) is provided as an in-line sensor that reads an image formed on paper sheet S transported from the image generator body 10 in accordance with an image read instruction from the controller 10a of the image generator body 10. The scanner 30a is placed above the transport path for paper sheet S in the inspection unit 30 and reads an image (output image) formed on the top face of the transported paper sheet S.

The scanner 30a is available as a line sensor or an image sensor. The line sensor includes a light emitting member and a plurality of photoelectric conversion elements that are linearly aligned throughout all or part of the region in the paper width direction (orthogonal to the paper transport direction). The image sensor includes photoelectric conversion elements placed in a matrix. The line sensor and the image sensor are available as a CCD-type image sensor or a CMOS-type (including MOS-type) image sensor. The inspection unit 30 may include an unshown reverser (reverse transport path). The reverser may reverse the top face (first face) and the bottom face (second face) of paper sheet S to read an image on the second face of paper sheet S. The scanner 30a, though placed above the transport path, may be placed above and below the transport path to read output images on the top face and the bottom face of paper sheet S through one pass (single operation).

The printer IF portion 30b communicates with the image generator body 10 and receives an image read command from the inspection unit 30 or transmits a read image to the image generator body 10.

Colorimeter

The colorimeter 5 (exemplifying a color value acquirer) includes a colorimetric portion 5a and a network IF portion 5b.

The colorimetric portion 5a is provided as a sensor that colorimetrically measures an image (such as a color chart formed outside an image formation region) formed on the paper positioned at the colorimeter 5 and outputs resulting colorimetric data. The colorimetric data helps in checking color tones of an image (output image) formed on the paper. The inspection unit 30 may include the function of the colorimeter 5. For example, the colorimetric portion 5a may be placed upstream or downstream of the paper transport direction for the scanner 30a provided for the inspection unit 30.

The network IF portion 5b connects to network N and communicates with the other units. For example, the network IF portion 5b transmits colorimetric data to the printer controller 3 via network N.

Example Hardware Configuration of Each Unit

FIG. 8 is a block diagram illustrating the hardware configuration of each unit according to one or more embodiments of the present invention.

The description below explains the hardware configuration of a computer 40 provided for the client terminal 2, the printer controller 3, and the image generator body 10 in the above-mentioned color management system 1. Each part of the computer 40 is selected in accordance with functions and purposes of the units.

The computer 40 includes a CPU (Central Processing Unit) 41, ROM (Read Only Memory) 42, and RAM (Random Access Memory) 43 each of which is connected to a bus 44. The computer 40 further includes a displayer 45, a manipulator 46, a nonvolatile storage 47 (exemplifying a recording medium), and a communication interface 48.

The CPU 41 reads a program code (also simply referred to as a program) of the software from the ROM 42 (exemplifying a recording medium) while the software implements the functions according to one or more embodiments of the present invention. The CPU 41 executes the program to implement the functions of the units illustrated in FIG. 6.

The computer 40 may include an arithmetic processing unit such as an MPU (Micro-Processing Unit) instead of the CPU 41.

The RAM 43 temporarily writes variables or parameters that are generated in the middle of the arithmetic processing. The displayer 45 is exemplified as a liquid crystal display monitor and displays results of processes executed on the computer 40. The manipulation display panel 26 (displayer 27) of the image generator body 10 exemplifies the displayer 45. The client terminal 2 also includes the displayer 45. The manipulator 46 uses a keyboard or a touch panel, for example, and enables a user to execute predetermined input manipulations or instructions. The manipulation display panel 26 (manipulator 28) of the image generator body 10 exemplifies the manipulator 46. The client terminal 2 also includes the manipulator 46.

The nonvolatile storage 47 is exemplified as an HDD (Hard Disk Drive), an SSD (Solid State Drive), a flexible disk, an optical disk, an optical magnetic disk, CD-ROM, CD-R, magnetic tape, or a nonvolatile memory card. The nonvolatile storage 47 may record a program allowing the computer 40 to function in addition to an OS (Operating System) or various parameters. As above, the nonvolatile storage 47 records scanner profile SP and printer profile PP (FIG. 7), for example.

For example, the communication interface 48 uses an NIC (Network Interface Card) capable of transmitting and receiving various types of data between the units via network N such as LAN. The communication interface 48 corresponds to the network IF portion 2e for the client terminal 2, the network IF portion 3e and the printer IF portion 3f for the printer controller 3, and the controller IF portion 10e and the scanner IF portion 10f for the image generator body 10. The printer controller 3 and the image generator body 10 may include two communication interfaces 48 depending on communication purposes. The communication interface 48 corresponds to the printer IF portion 30b for the inspection unit 30 and the network IF portion 5b for the colorimeter 5.

Chart Generation Function of the Scanner Profile Processor

The description below explains in detail the scanner profile processor 3c of the printer controller 3 with reference to FIGS. 9 through 12. Suppose the image generator body 10 includes a color material such as red (R) as the fifth color in addition to CMYK process colors.

Figure 9:
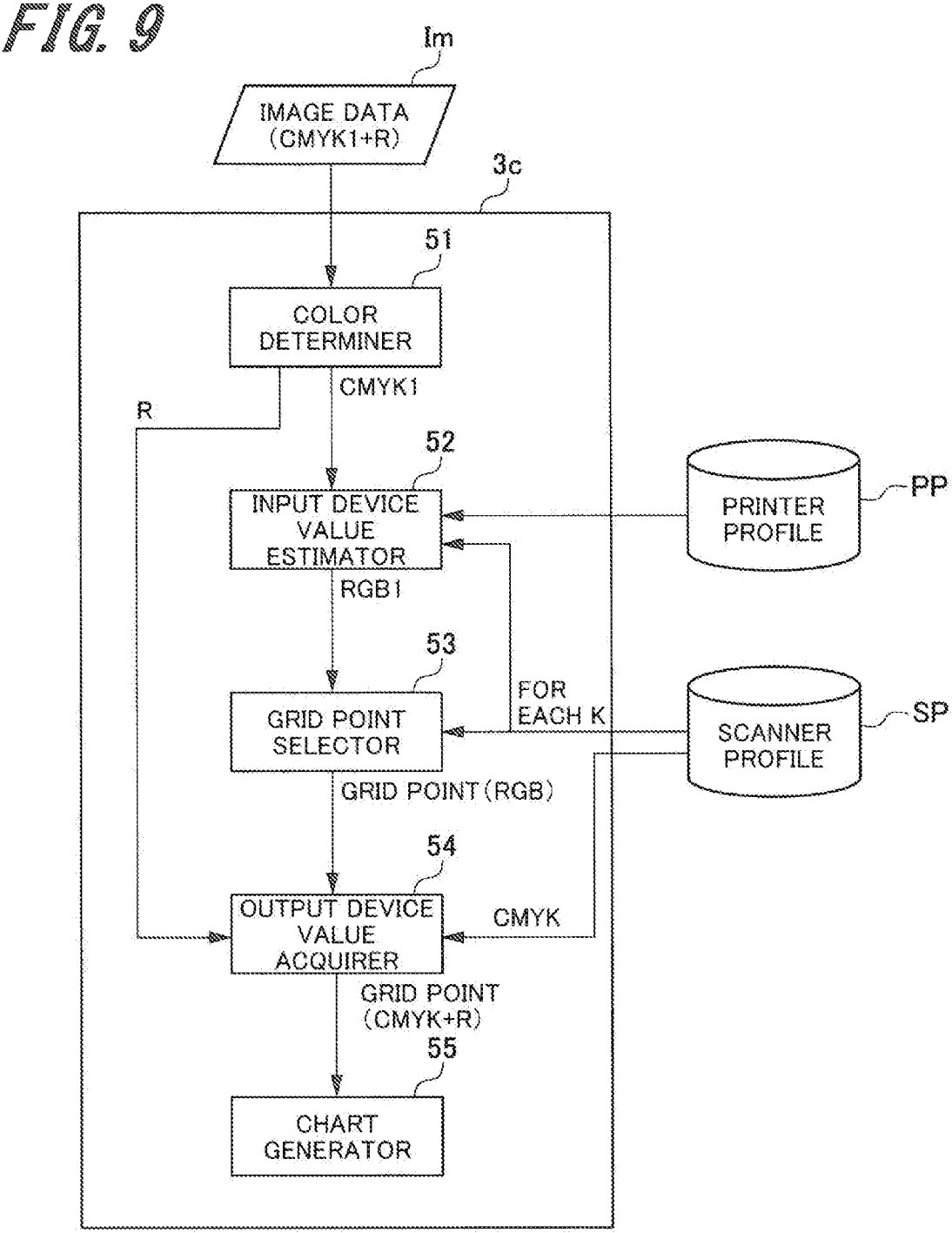
FIG. 9 is a block diagram illustrating an internal configuration (chart generation function) of a scanner profile processor in FIG. 6.

FIG. 9 is a block diagram illustrating an internal configuration (chart generation function) of the scanner profile processor 3c according to one or more embodiments of the present invention. The printer controller 3 illustrated in FIG. 9 includes a color determiner 51, an input device value estimator 52, a grid point selector 53, an output device value acquirer 54, and a chart generator 55.

The color determiner 51 executes a process that determines whether an output device value for each pixel of raster image Im (input image data) contains at least one piece of information about the color (R) except the process colors (CMYK), and outputs a determination result to the input device value estimator 52. The color determiner 51 determines whether a color except the CMYK process colors is contained in color components of the raster image (pixel) in a job, a page, or a specified region.

The input device value estimator 52 executes a process that uses printer profile PP and scanner profile SP and estimates an RGB input device value corresponding to the CMYK output device value for the pixel of raster image Im containing the color other than the CMYK colors. Namely, the input device value estimator 52 estimates an input device value (RGB1) for RGB corresponding to a CMYK output device value (CMYK1) for the targeted pixel when the color determiner 51 determines that the information about the color (R) except CMYK is contained in the output device value for the pixel of raster image Im.

The grid point selector 53 executes a process that selects a plurality of grid points from scanner profile SP on condition that the grid points are capable of interpolating the RGB input device value (RGB1) estimated by the input device value estimator 52.

The output device value acquirer 54 executes a process that acquires an output device value (CMYKR) for color patch corresponding to each grid point in scanner profile SP selected by the grid point selector 53 by appending the information about the color (R) except CMYK of the targeted pixel to the CMYK output device value retained at the grid point.

The chart generator 55 executes a process that generates chart image data containing a color patch based on the output device value for color patch at each grid point acquired by the output device value acquirer 54. The output portion 10b (image generator 20) of the image generator body 10 outputs the chart image data to paper sheet S.

Example Processes on the Scanner Profile Processor

The description below explains in detail example processes on the scanner profile processor 3c of the printer controller 3 with reference to FIGS. 10 through 17.

Figure 10:
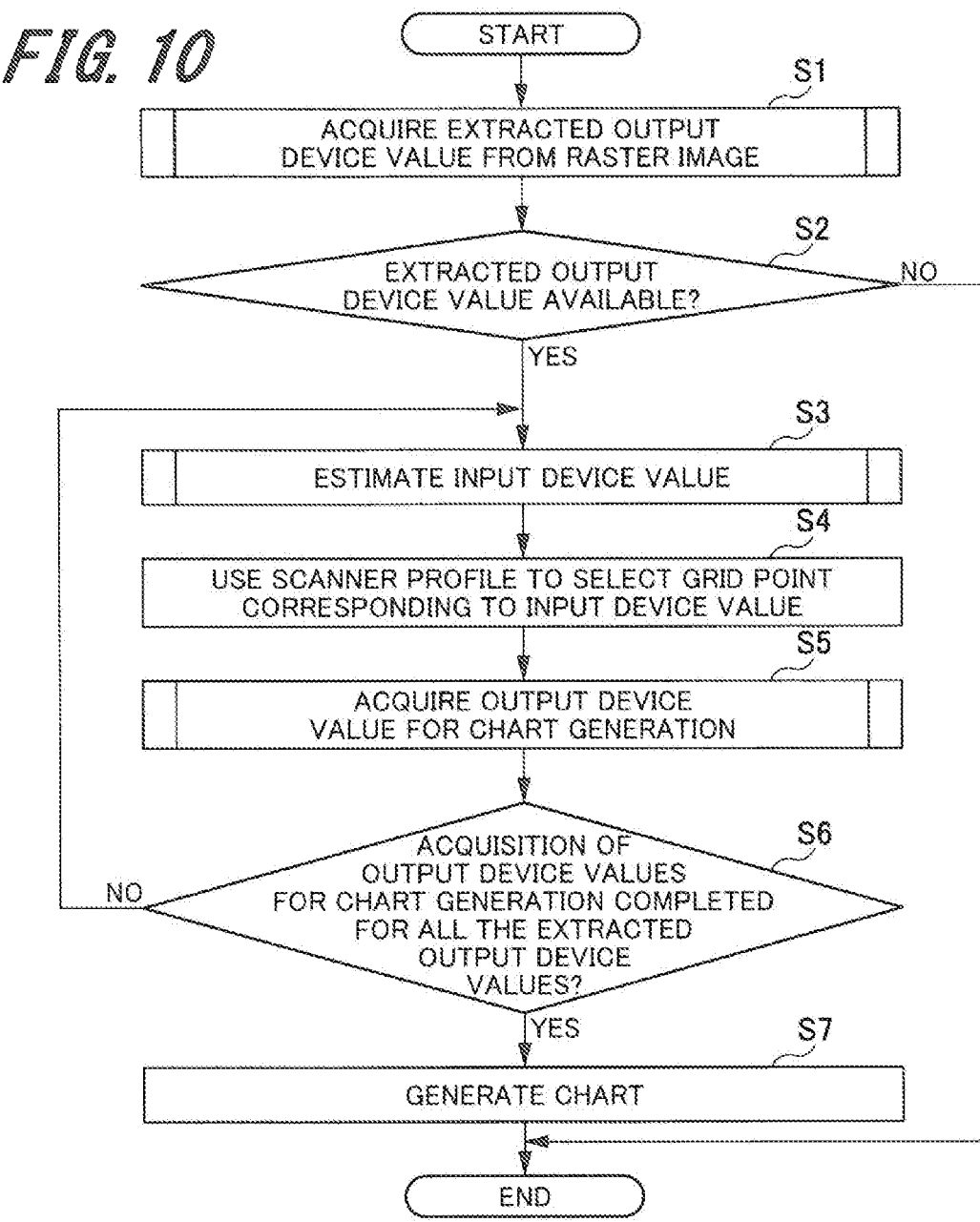
FIG. 10 is a flowchart illustrating a chart generation process of the scanner profile processor according to one or more embodiments of the present invention.

FIG. 10 is a flowchart illustrating a chart generation process of the scanner profile processor 3c according to one or more embodiments of the present invention.

Figures 11, 12:
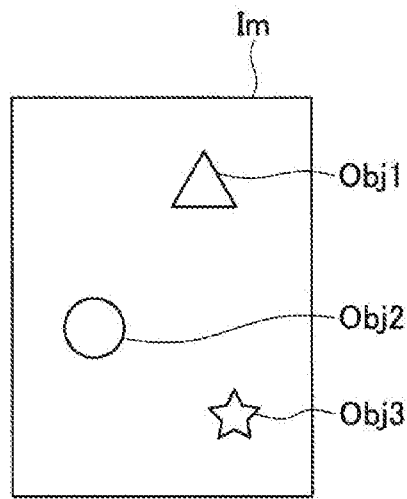
FIG. 11 is an explanatory diagram illustrating a raster image according to one or more embodiments of the present invention.
FIG. 12 is an explanatory diagram illustrating extraction of output device values according to one or more embodiments of the present invention.

FIG. 11 illustrates a raster image according to one or more embodiments of the present invention.

FIG. 12 illustrates extraction of output device values according to one or more embodiments of the present invention.

Figure 13:
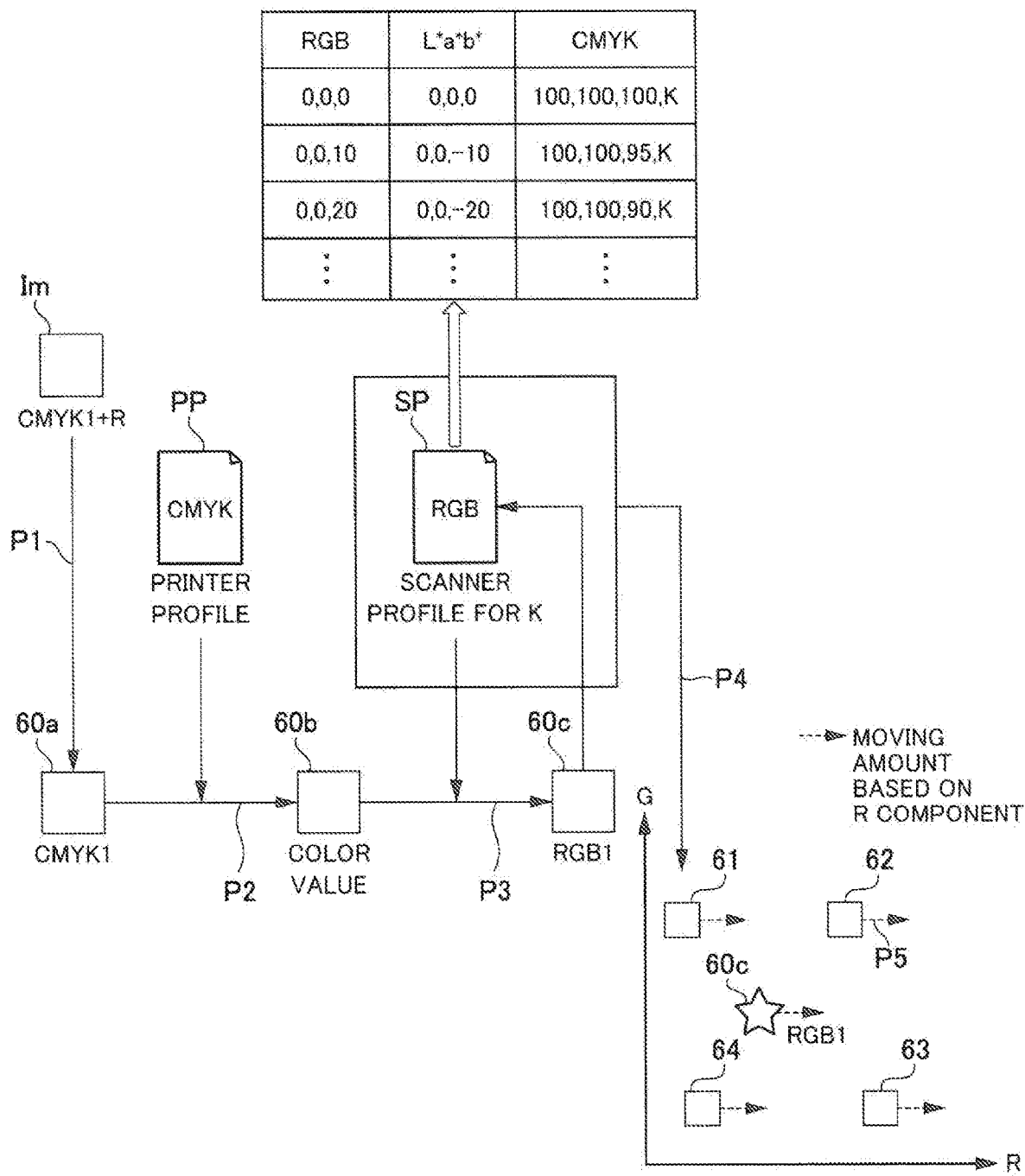
FIG. 13 is an explanatory diagram illustrating a flow of acquisition of output device values for profile generation according to one or more embodiments of the present invention.

FIG. 13 illustrates a flow of acquisition of output device values for profile generation according to one or more embodiments of the present invention.

Figure 14:
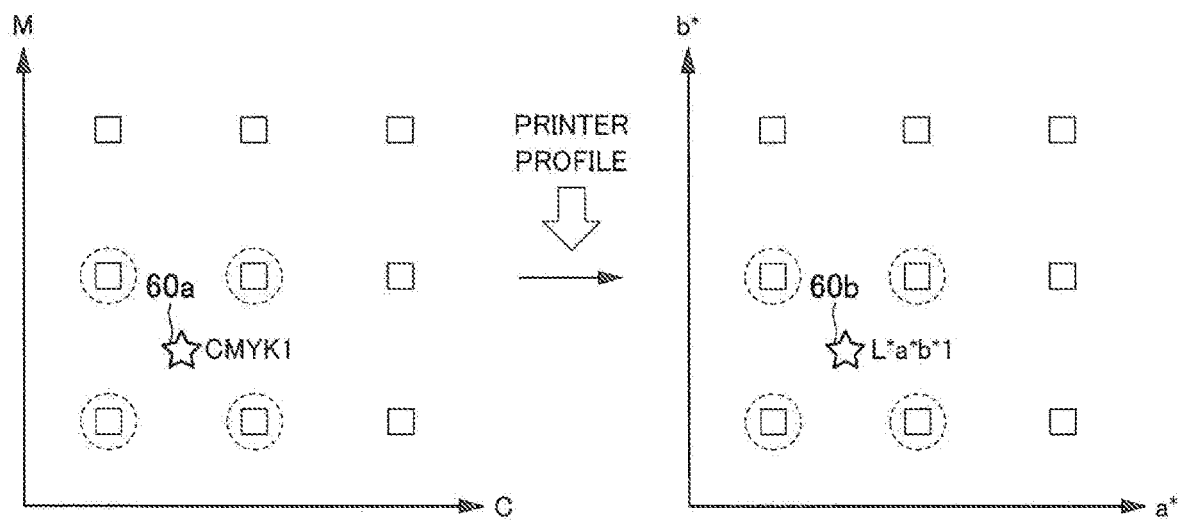
FIG. 14 is an explanatory diagram illustrating color conversion using a printer profile according to one or more embodiments of the present invention.

FIG. 14 is an explanatory diagram illustrating color conversion using a printer profile according to one or more embodiments of the present invention.

Figure 15:
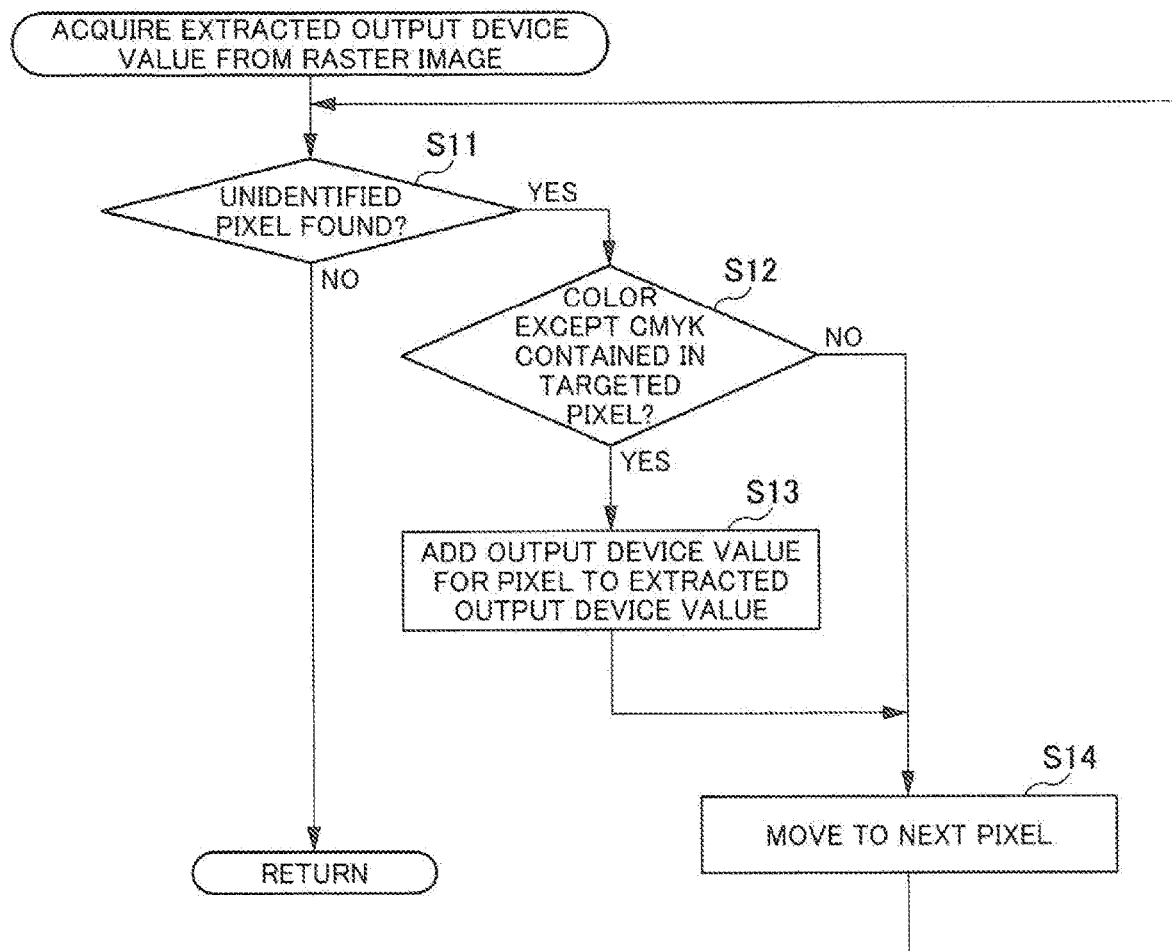
FIG. 15 is a flowchart illustrating a process to acquire an extracted output device values from a raster image at step S1 in FIG. 10.

FIG. 15 is a flowchart illustrating a process to acquire extracted output device values from a raster image at step S1 in FIG. 10.

Figure 16:
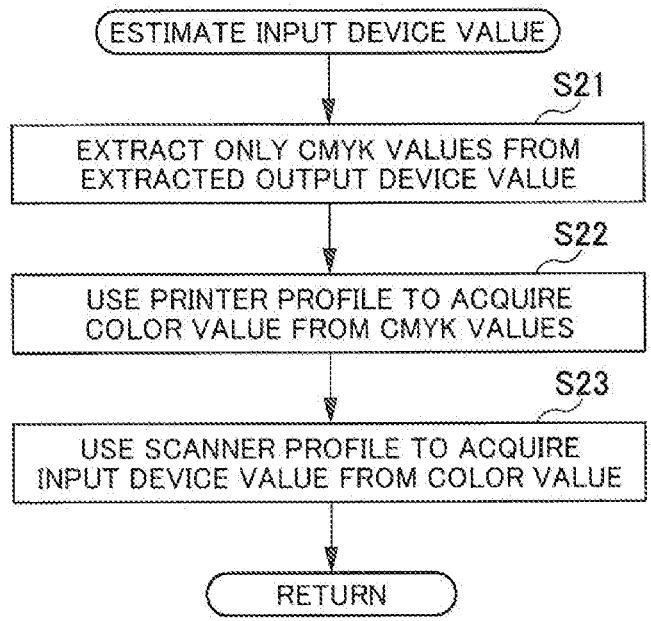
FIG. 16 is a flowchart illustrating an input device value estimation process at step S3 in FIG. 10.

FIG. 16 is a flowchart illustrating an input device value estimation process at step S3 in FIG. 10.

Figure 17:
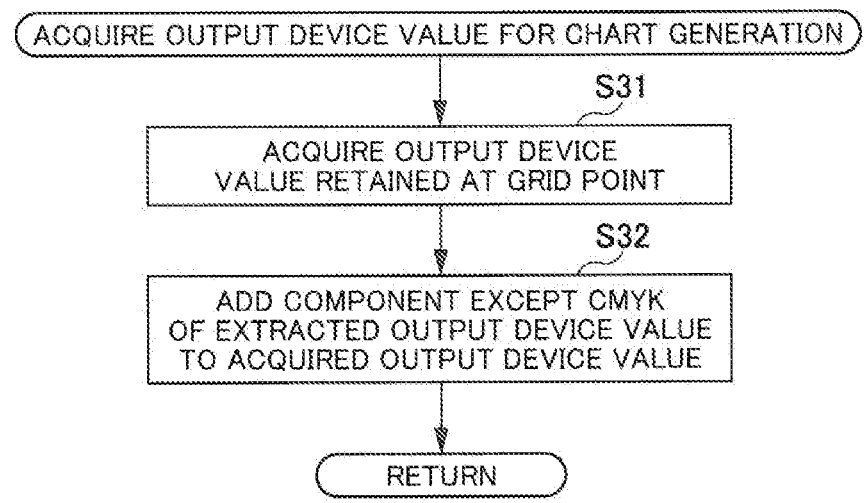
FIG. 17 is a flowchart illustrating a process to acquire output device values for chart generation at step S5 in FIG. 10.

FIG. 17 is a flowchart illustrating a process to acquire output device values for chart generation at step S5 in FIG. 10.

The chart generation process on the scanner profile processor 3c in FIG. 10 requires previously entering a print job to the printer controller 3 in terms of the image generator body 10 including color materials such as the CMYK process colors and red (R). The RIP portion 3a of the printer controller 3 executes an RIP process on the print job to generate raster image Im (see FIG. 11).

One or more embodiments of the present invention assume that raster image Im includes color information about red (R) in the process colors (CMYK). According to an example in FIG. 11, raster image Im includes three objects Obj1 through Obj3. As illustrated in FIG. 12, an image region for object Obj1 (triangle) indicates a CMYKR value (100, 100, 0, 0, 0) that lacks the R component. An image region for object Obj2 (circle) indicates a CMYKR value (0, 20, 20, 0, 80) that includes the R component. An image region for object Obj3 (star) indicates a CMYKR value (0, 0, 100, 0, 0) that lacks the R component. The other image region (white base) indicates a CMYKR value (0, 0, 0, 0, 0) that lacks the R component.

The color determiner 51 executes a process that acquires an extracted output device value from raster image Im (S1). The extracted output device value signifies an output device value containing the information about a color other than the process colors (such as CMYK). The process at step S1 will be explained in detail with reference to FIG. 15.

Process to Acquire the Extracted Output Device Value from a Raster Image

As illustrated in FIG. 15, the color determiner 51 determines pixel by pixel whether raster image Im contains an unidentified pixel (S11). If an unidentified pixel is unavailable (No at S11), the sequence of processes terminates and control returns to the process at step S2. If an unidentified pixel is available (YES at S11), the color determiner 51 determines whether the targeted pixel contains a color except CMYK (S12). If the targeted pixel contains a color except CMYK (YES at S12), the output device value (Obj2 in FIG. 12) for the targeted pixel is added to a list of extracted output device values (S13).

After the process at step S13, or at S12, if the targeted pixel does not contain a color except CMYK (NO at S12), the color determiner 51 proceeds to the next pixel (S14). The color determiner 51 repeats the process at steps S11 through S14 until an unidentified pixel is unavailable, and returns to the process at step S2 in FIG. 10 after confirming all pixels. As above, the color determiner 51 executes the process that scans each pixel of raster image Im and extracts an output device value (CMYK1+R in FIG. 13) for the pixel (corresponding to object Obj2) whose red component is not 0.

Return to the description of the flowchart in FIG. 10. After the process at step S1, the color determiner 51 determines whether an extracted output device value is available (S2). If an extracted output device value is unavailable (NO at S2), the sequence of processes terminates. If an extracted output device value is available (YES at S2), the input device value estimator 52 estimates an input device value corresponding to the extracted output device value (S3). The process at step S3 will be described in detail with reference to FIG. 16.

Input Device Value Estimation Process

As illustrated in FIGS. 13 and 16, the input device value estimator 52 extracts only the CMYK value (CMYK1 at input point 60a) as a process color component from the extracted output device value (S21 and process P1 in FIG. 13).

The input device value estimator 52 references printer profile PP and acquires the color value (L*a*b* at input point 60b) corresponding to the extracted CMYK value (CMYK1) (S22 and process P2 in FIG. 3). As illustrated in FIG. 14, four grid points (indicated by broken lines at the left part of FIG. 14) are selected because of being close to the output device value (CMYK1) at input point 60a as a processing target in the CMYK color space with reference to printer profile PP. Four grid points (indicated by broken lines at the right part of FIG. 14) for the corresponding color value (L*a*b*1) are determined. FIG. 14 illustrates nine grid points (square) around the output device value (CMYK1) and the color value (L*a*b*1) as processing targets. FIG. 14 two-dimensionally represents CMYK and L*a*b* color spaces for the sake of description (by using CM coordinate axes and a*b* coordinate axes).

The input device value estimator 52 references scanner profile SP and acquires an input device value (RGB1 at input point 60c) for the scanner 30a and four grid points 61 through 64 (S23 and process P3 in FIG. 13) from the above-mentioned color value. The same concept for process P2 applies to process P3 that determines the four grid points 61 through 64 in the RGB color space from the L*a*b* color space in FIG. 13. Printer profile PP used for this process just needs to include the profile information corresponding to at least the process colors (CMYK) for the image generator body 10.

The input device value estimator 52 returns to step S4 in FIG. 10 after the process at step S23. Scanner profile SP may be provided for each K ingredient amount and the input device value (RGB1) may be acquired by using scanner profile SP corresponding to the K ingredient amount of the CMYK value (CMYK1) at step S23 (process P3 in FIG. 13). In this case, scanner profile SP can be used to accurately convert the CMYK value into a color value corresponding to the K ingredient amount.

Return to the description of the flowchart in FIG. 10. After the process at step S3, the grid point selector 53 references scanner profile SP and selects the four grid points 61 through 64 corresponding to the input device value (RGB1) estimated in the RGB space (S4 and process P4 in FIG. 13). FIG. 13 two-dimensionally represents the RGB color space (using RG coordinate axes) for the sake of description.

The grid point selector 53 according to one or more embodiments of the present invention selects at least four grid points not belonging to the same plane in the RGB space as the grid points capable of interpolating the estimated input device value. The scanner profile can be used to interpolate any input device value by selecting the grid points as above. It is favorable to select a combination of grid points closest to the input device value as the grid points capable of interpolating the estimated input device value. This can more accurately interpolate any input device value.

According to one or more embodiments of the present invention, each grid point in scanner profile SP previously retains the CMYK value used to generate scanner profile SP. The output device value acquirer 54 references scanner profile SP to acquire an output device value for chart generation (S5). The process at step S5 will be described in detail with reference to FIG. 17.

Process to Acquire Output Device Values for Chart Generation

As illustrated in FIG. 17, the output device value acquirer 54 acquires output device values (CMYK) retained at the grid points 61 through 64 selected by scanner profile SP (S31).

The output device value acquirer 54 adds the component (R component) except the CMYK components of the output device value extracted at step S1 (FIG. 10) to the acquired output device values (CMYK) for the grid points 61 through 64 and calculates output device values (CMYKR values) for color patch at the grid points 61 through 64 (S32 and process P5 in FIG. 13). The output device values for color patch at a plurality of grid points (grid points 61 through 64 in this example) are selected correspondingly to the output device values (extracted output device values) calculated by the output device value acquirer 54 for the targeted pixel and are generically referred to as output device values for chart generation. A dashed arrow attached to each grid point in FIG. 13 represents a moving direction and a moving amount corresponding to the R components at the grid points 61 through 64 selected in the RGB space. The output device value acquirer 54 proceeds to the process at step S6 in FIG. 10 after the process at step S32.

Return to the description of the flowchart in FIG. 10. After the process at step S5, the output device value acquirer 54 determines whether the process to acquire output device values for chart generation is completed for all the extracted output device values (S6). If the process to acquire output device values for chart generation is not completed for all the extracted output device values (NO at S6), control returns to step S3 and the input device value estimator 52 executes the process to estimate the input device value.

If the process to acquire output device values for chart generation is completed for all the extracted output device values (YES at S6), the chart generator 55 generates a chart image including a set of aligned color patches based on the output device values for chart generation (S7). After the process at step S7, the chart generator 55 terminates the sequence of processes.

Raster image Im may include a plurality of pixels containing a color other than CMYK and a plurality of extracted output device values may be accordingly available. In such a case, the chart generator 55 deletes a color patch including overlapped output device values for color patch. For example, the same output device value may be used for two objects available at different locations in raster image Im. In such a case, one set of (four) color patches (one chart image) is generated in common. The same grid point is highly likely to be selected when a detected object includes the CMYKR values (0, 19, 19, 0, 80) approximate to the CMYKR values (0, 20, 20, 0, 80) for object Obj2 in FIG. 12. The chart generator 55 deletes an overlapping color patch from the object (extracted output device value) for which the same grid point is selected. This can reduce materials or hardware resources.

Figure 18:
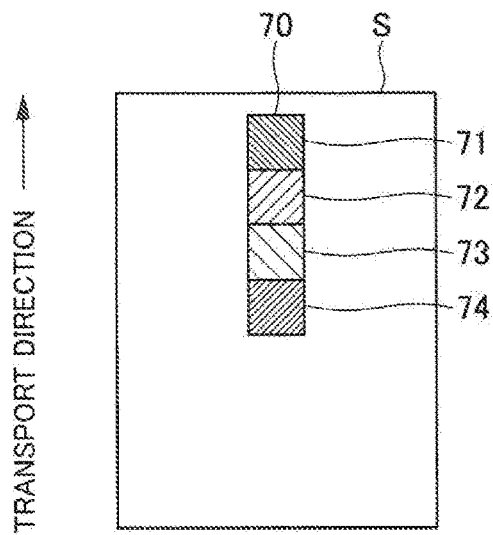
FIG. 18 is an explanatory diagram illustrating a chart image generated by a chart generator according to one or more embodiments of the present invention.

FIG. 18 illustrates a chart image generated by the chart generator 55 according to one or more embodiments of the present invention.

A chart image 70 formed on paper sheet S includes color patches 71 through 74 aligned in the paper transport direction. The color patches 71 through 74 are generated based on the output device values for chart generation (CMYKR values) at the grid points 61 through 64 in FIG. 13.

Scanner Profile Generation Function of the Scanner Profile Processor

The description below explains a scanner profile generation function of the scanner profile processor 3c in the printer controller 3. The printer controller 3 allows the scanner profile processor 3c to execute a scanner profile generation process by stopping the print job.

Figure 19:
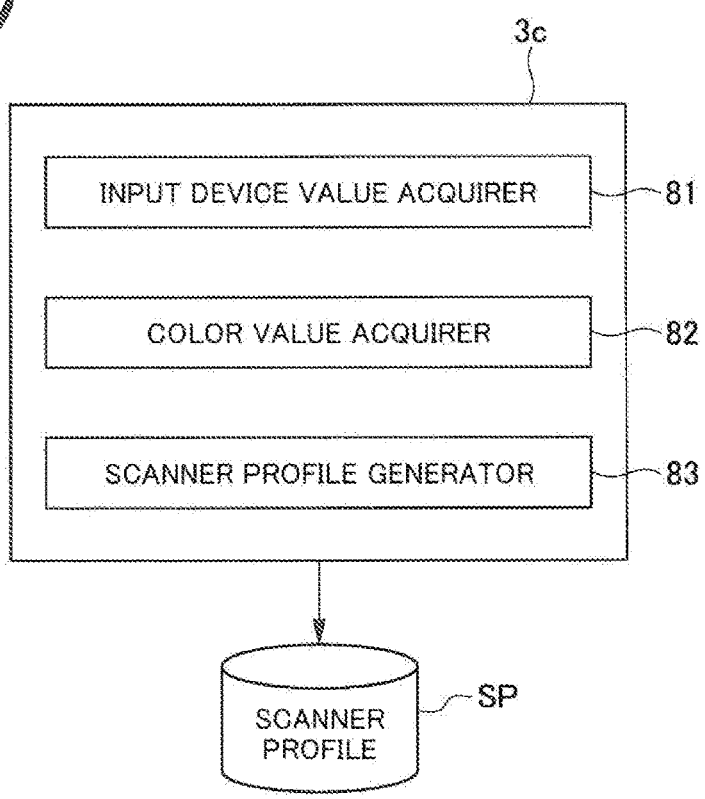
FIG. 19 is a block diagram illustrating an internal configuration (scanner profile generation function) of the scanner profile processor in FIG. 6.

FIG. 19 is a block diagram illustrating an internal configuration (scanner profile generation function) of the scanner profile processor 3c according to one or more embodiments of the present invention. As illustrated in FIG. 19, the printer controller 3 includes an input device value acquirer 81, a color value acquirer 82, and a scanner profile generator 83 as the scanner profile generation function.

The input device value acquirer 81 acquires an input device value (RGB) of each color patch read from the paper to which the scanner 30a (FIG. 5) of the inspection unit 30 outputs a chart image in CMYKR.

Figure 20:
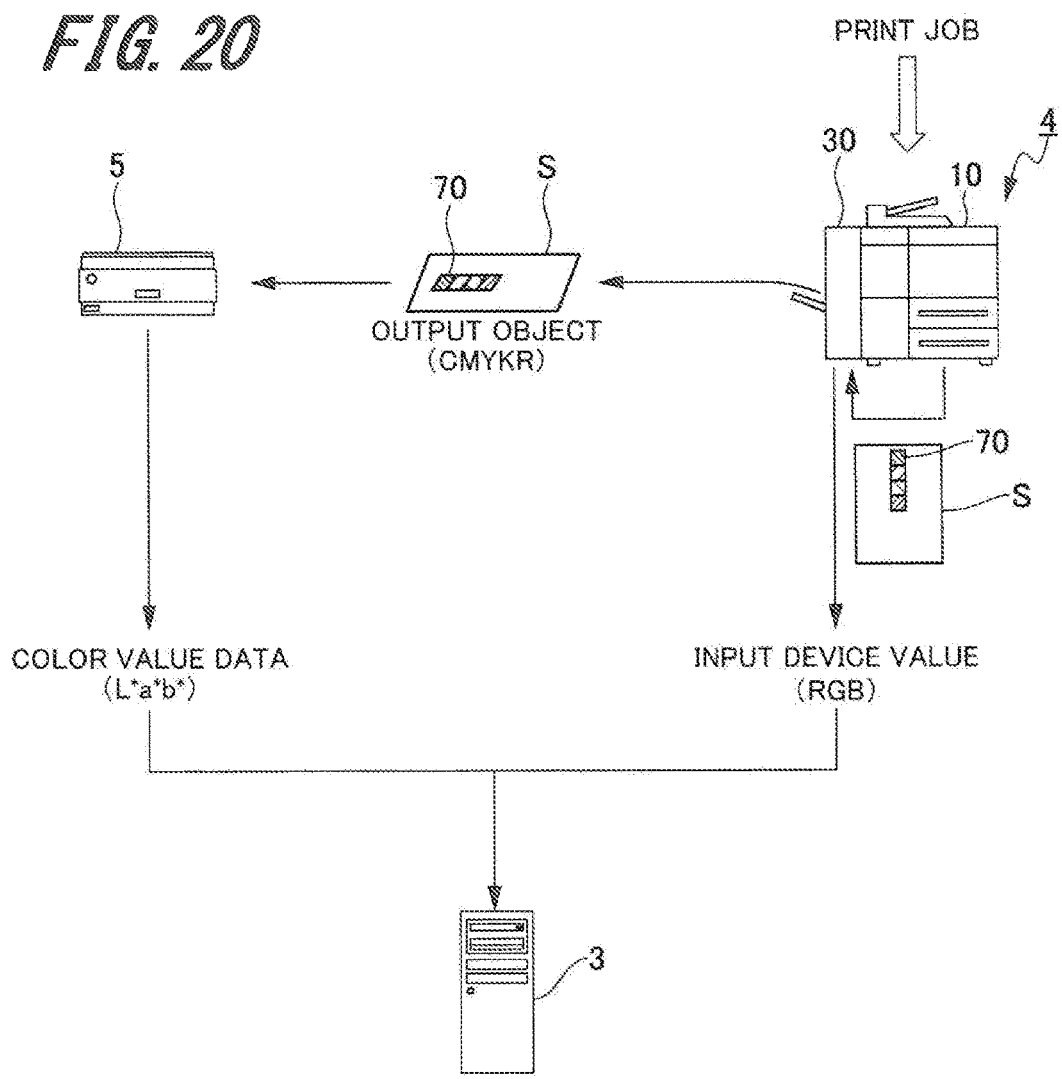
FIG. 20 is an explanatory diagram illustrating scanner profile generation according to one or more embodiments of the present invention.

The color value acquirer 82 acquires color value data (L*a*b*) for each color patch read from the output object (paper) to which the colorimeter 5 (see FIG. 20) outputs a CMYKR chart image.

The scanner profile generator 83 generates a new grid point by correlating the input device value (RGB value) acquired by the input device value acquirer 81 with the color value data (L*a*b*) acquired by the color value acquirer 82. The new grid point is added to scanner profile SP. The scanner profile generator 83 allows the new grid point to retain the output device value (CMYKR value) for the chart image in addition to the input device value and the color value data.

Figure 21:
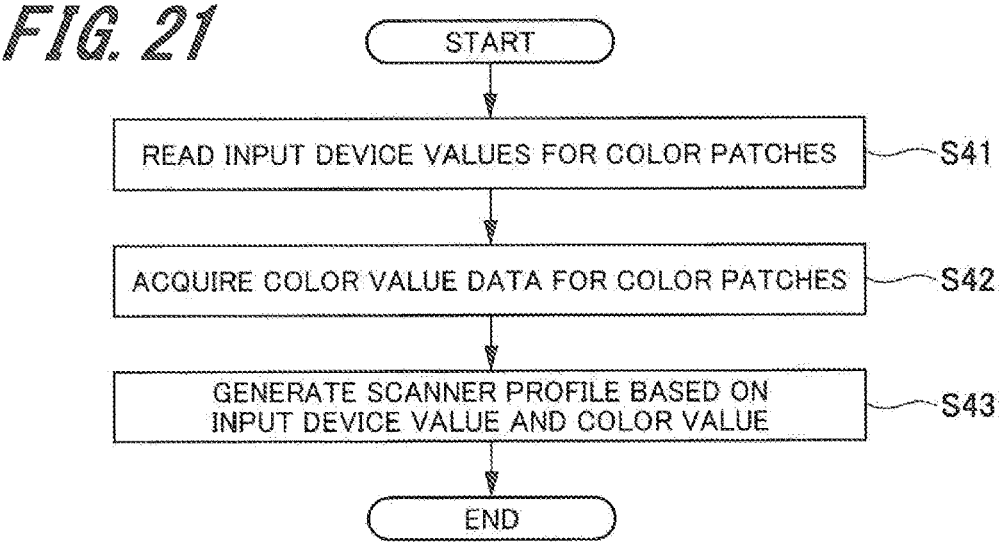
FIG. 21 is a flowchart illustrating a scanner profile generation process in the color management system according to one or more embodiments of the present invention.

FIG. 21 is a flowchart illustrating a scanner profile generation process in the color management system 1 according to one or more embodiments of the present invention.

The printer controller 3 interprets a print job output from the client terminal 2 and transmits the print job to the image generator body 10 while the print job includes raster image Im containing the R component in addition to the CMYK components. The controller 10a of the image generator body 10 generates the chart image 70 including the color patches 71 through 74 based on the output device value including information about the color (R) other than the CMYK process colors of raster image Im. The output portion 10b outputs the chart image 70 to paper sheet S. Paper sheet S where the chart image 70 is formed is transported from the image generator body 10 to the inspection unit 30. The scanner 30a of the inspection unit 30 reads input device values (RGB) for the color patches 71 through 74 (see FIG. 18) formed on paper sheet S (S41) and transmits a read result to the printer controller 3.

It is supposed that the chart image 70 including the color patches 71 through 74 is formed on paper sheet S (output object). A user positions this paper sheet S at the colorimeter 5 to colorimetrically measure the color patches 71 through 74 for the chart image 70. The colorimeter 5 acquires color value data (L*a*b*) for the color patches 71 through 74 (S42) and transmits the color value data to the printer controller 3 via network N.

The scanner profile generator 83 allows the input device value acquirer 81 to acquire the input device value (RGB value) and allows the color value acquirer 82 to acquire the color value data (L*a*b*). The scanner profile generator 83 generates scanner profile SP based on the input device value (RGB value) and the color value data (L*a*b*) (S43). Namely, a new grid point is generated by correlating the input device value (RGB value) with the color value data (L*a*b*) and is registered to scanner profile SP. After the process at step S43, the scanner profile generator 83 terminates the sequence of processes in FIG. 21.

Effects of the Above-Mentioned Embodiments

An image on the output object to be read may contain a color other than process colors (a color originally missing from scanner profile SP). In such a case, the above-mentioned embodiments can generate a color patch corresponding to the grid point in scanner profile SP for the part needed to convert the color (input device value) of the image. The part needed to convert the color other than process colors conforms to a grid point around the input point. The scanner 30a and the colorimeter 5 read color information about the color patch. Respective read results can be used to generate a grid point only for the needed part in scanner profile SP.

Therefore, the amount of chart images (color patches) to be output or the number of sheets decreases and the consumption of materials can be greatly reduced in comparison with the case of generating scanner profile SP corresponding to the color space including a specific color (such as R) in addition to the process colors (such as CMYK) or generating the scanner profile correspondingly to the amount of specific color components.

The above-mentioned embodiments can generate a grid point in scanner profile SP only for a needed part and can reduce the amount of chart images (color patch images) or the number of pages to be output. It is therefore possible to greatly reduce the labor or the time needed for the scanner profile generation.

One or more embodiments of the present invention provide an example that adds a grid point, namely, a color patch, by excluding a grid point already selected by the grid point selector 53 when the number of color patches allocable to the paper is larger than the number of output device values (objects) including a color other than CMYK.

Figure 22:
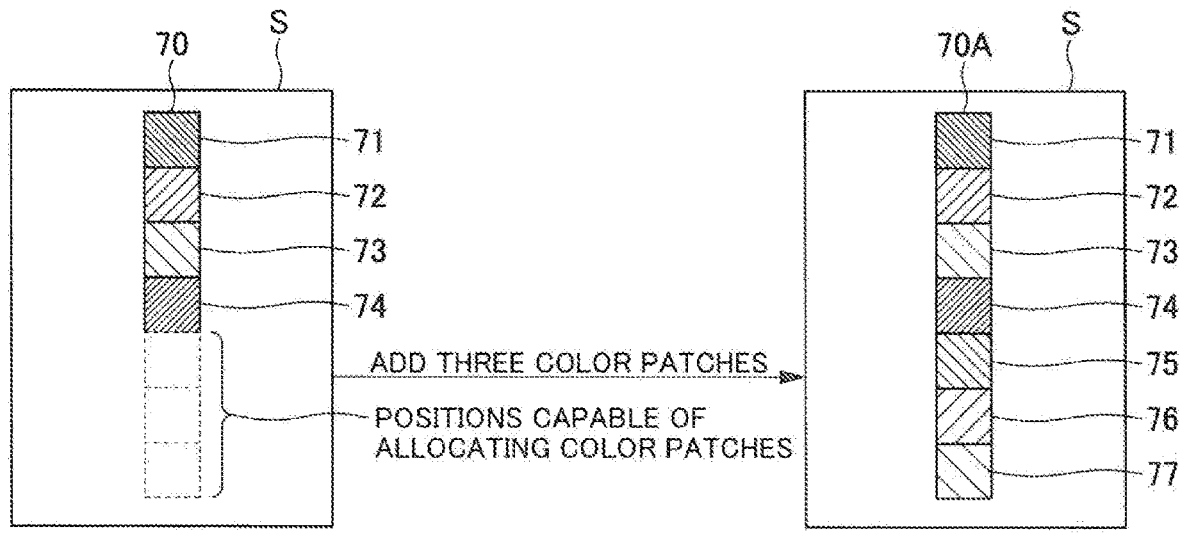
FIG. 22 is an explanatory diagram illustrating color patch addition according to one or more embodiments of the present invention.

FIG. 22 illustrates color patch addition according to one or more embodiments of the present invention.

Figure 23:
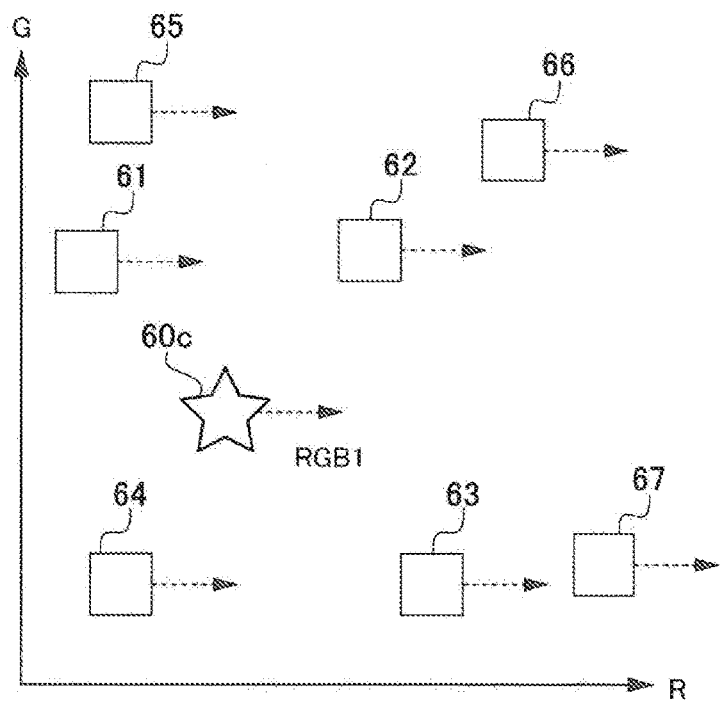
FIG. 23 is an explanatory diagram illustrating grid points corresponding to an added color patch according to one or more embodiments of the present invention.

FIG. 23 is an explanatory diagram illustrating grid points corresponding to an added color patch according to one or more embodiments of the present invention.

There is an upper limit on the number of color patches allocable to one or more sheets of paper. In FIG. 22, three color patches can be additionally allocated below the chart image 70 generated in the above-mentioned embodiments. The number of color patches allocated to the chart image 70 generated in the above-mentioned embodiments may be smaller than the upper limit on allocable color patches. In such a case, an additional color patch is selected so as to be different from the grid points 61 through 64 (FIG. 13) selected in the above-mentioned embodiments and is added to the chart image. The additional grid points 65 through 67 are selected (see FIG. 23) because the grid points 65 through 67 are closest to the input point 60c (RGB1) in the input color space except the already selected grid points 61 through 64. Color patches 75 through 77 (see FIG. 22) are generated from the output device value resulting from the selected grid points 65 through 67 by adding the R component to the CMYK components. A chart image 70A including the color patches 71 through 77 is generated.

Example Processes Executed by the Scanner Profile Processor

Figure 24:
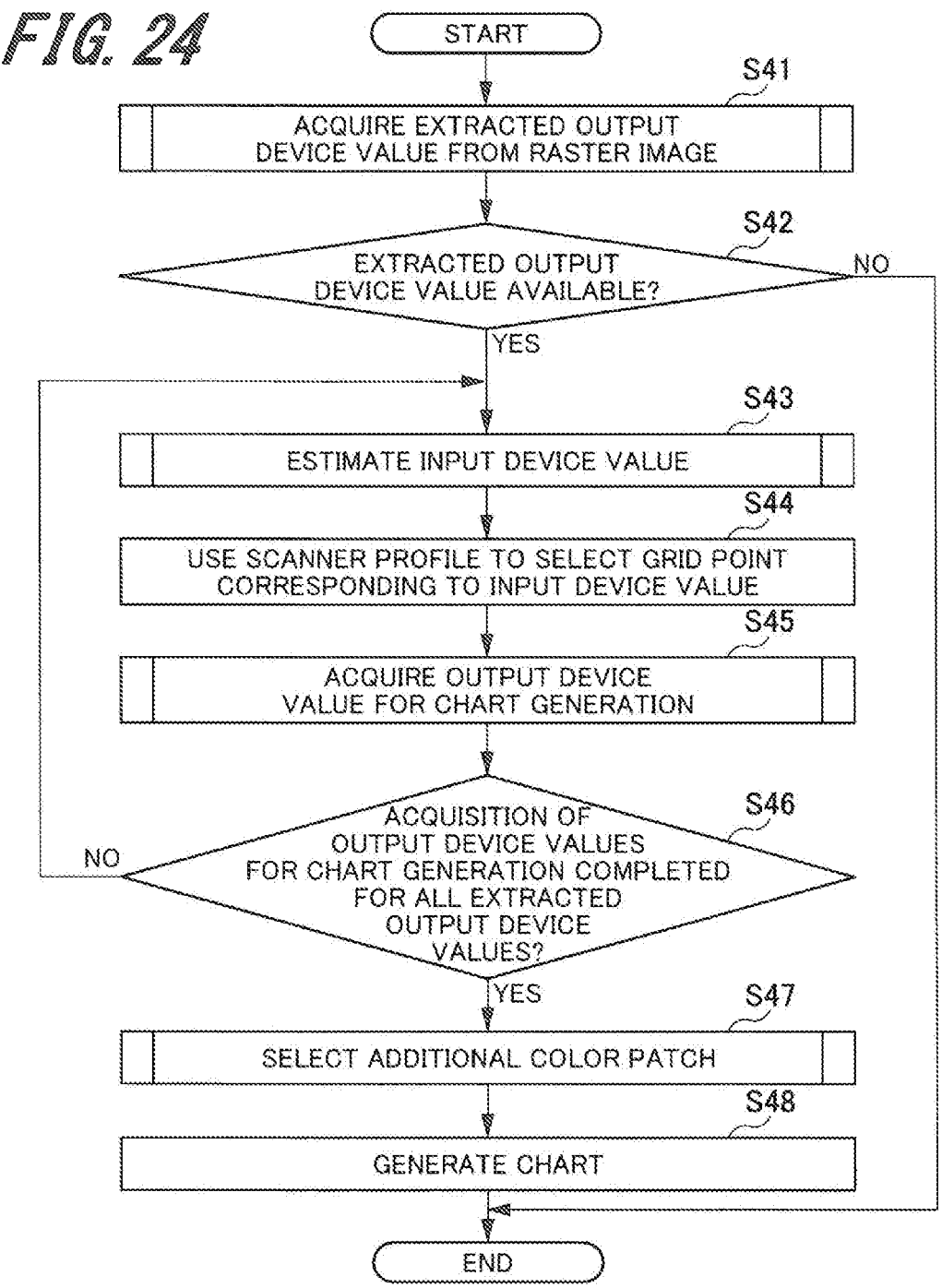
FIG. 24 is a flowchart illustrating a chart generation process of the scanner profile processor according to one or more embodiments of the present invention.

FIG. 24 is a flowchart illustrating a chart generation process of the scanner profile processor 3c according to one or more embodiments of the present invention.

In FIG. 24, each portion of the scanner profile processor 3c executes the process at steps S41 through S46. The process at steps S41 through S46 are equal to the process at steps S1 through S6 in FIG. 10 and a description is omitted.

When the process to acquire the output device value for chart generation is completed for all the extracted output device values (NO at S46), the output device value acquirer 54 executes an additional color patch selection process (S47). The process at step S47 will be described in detail with reference to FIG. 25 to be described later.

The chart generator 55 generates a chart image including a set of aligned color patches based on the output device value for chart generation (S48). After the process at step S48, the chart generator 55 terminates the sequence of processes.

Additional Color Patch Selection Process

The additional color patch selection process will be described with reference to FIGS. 25 through 27.

Figure 25:
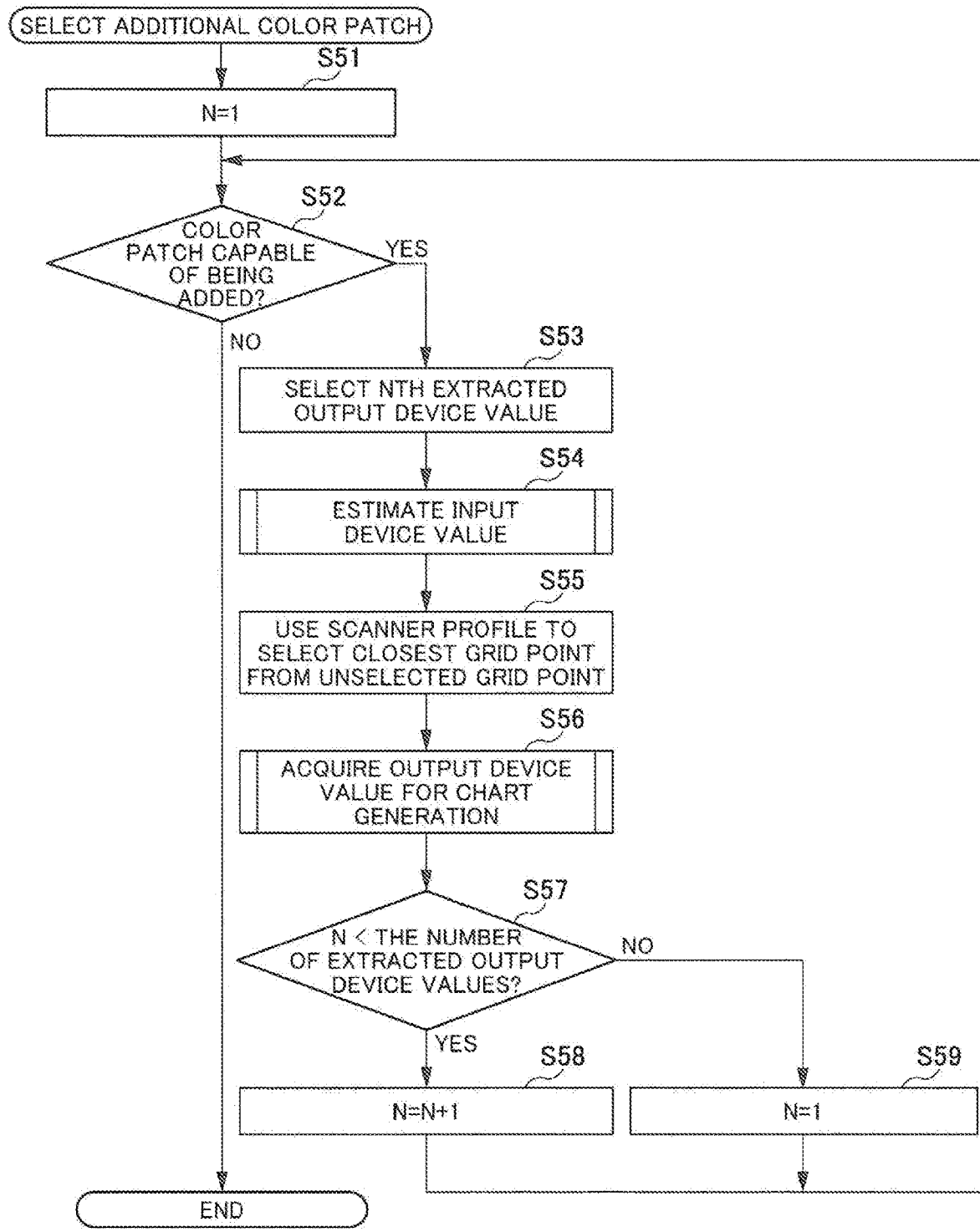
FIG. 25 is a flowchart illustrating an additional color patch selection process at step S47 in FIG. 24.
Figure 26:
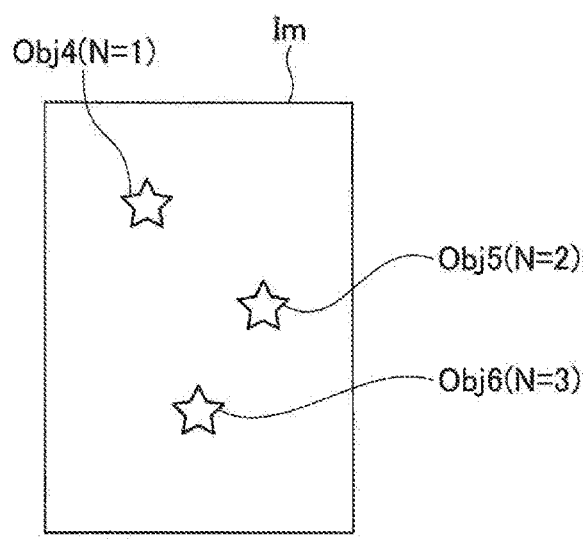
FIG. 26 is an explanatory diagram illustrating a raster image according to one or more embodiments of the present invention.

FIG. 25 is a flowchart illustrating the additional color patch selection process at step S47 in FIG. 24. FIG. 26 illustrates a raster image. The example in FIG. 26 assumes that raster image Im includes three objects Obj4 through Obj6 (star) and the R component is contained in the image region for each of objects Obj4 through Obj6. The number of extracted output device values (objects) is not counted if the extracted output device values are equal or substantially equal (namely, the same output device values for chart generation). Raster image Im is assumed to include three objects Obj4 through Obj6 provided with different output device values. The number of extracted output device values is "3." Number N is assigned to objects Obj4 through Obj6 in order to uniquely identify the object in one page. Number N "1" is assigned to object Obj4. Number N "2" is assigned to object Obj5. Number N "3" is assigned to object Obj6.

Figure 27:
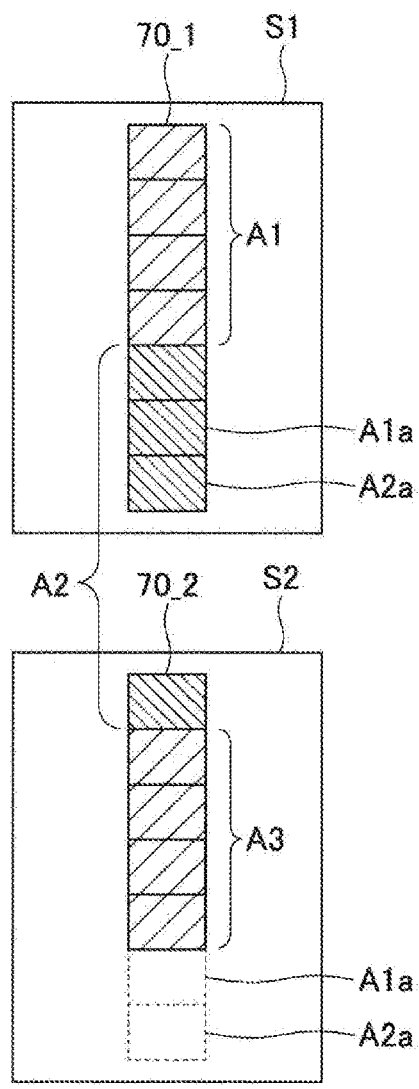
FIG. 27 is an explanatory diagram illustrating color patch addition when color patches according to one or more embodiments of the present invention cover two pages.

The flowchart in FIG. 25 presupposes that a color patch as illustrated in FIG. 27 covers two pages. First paper sheet S1 includes seven color patch allocating positions. Second paper sheet S2 also includes seven color patch allocating positions. Raster image Im contains three objects, namely, three input device values. Extracting four output device values for chart generation per input device value leaves two color patch allocating positions. In FIG. 27, four color patches corresponding to object Obj4 are allocated to region A1 so as to fill four color patches on paper sheet S1. Similarly, four color patches corresponding to object Obj5 are allocated to region A2 so as to fill three color patches on paper sheet S1 below region A1 and one color patch at the top of paper sheet S2. Further, four color patches corresponding to object Obj6 are allocated to region A3 so as to fill four color patches below A2 on paper sheet S2. There remain positions capable of allocating two color patches below region A3.

In FIG. 25, the chart generator 55 starts the additional color patch process and sets N to 1 (N=1) (S51).

The chart generator 55 determines whether a color patch can be added to the paper (S52). In FIG. 22, for example, there are three positions capable of allocating color patches and it is therefore determined that a color patch can be added. The chart generator 55 proceeds to the process at step S53 if determining that a color patch can be added (YES at S52). The chart generator 55 terminates the process if determining that no color patch can be added (NO at S52).

If the chart generator 55 determines that a color patch can be added (YES at S52), the input device value estimator 52 selects the Nth extracted output device value (S53). Because of N=1, the extracted output device value for object Obj4 in FIG. 26 is selected as the first extracted output device value. The extracted output device value for object Obj4 is used to generate a color patch in region A1a.

The input device value estimator 52 then estimates an input device value corresponding to the selected extracted output device value (S54). At step S54, the input device value estimator 52 can use the input device value corresponding to the extracted output device value estimated at step S43.

The grid point selector 53 references scanner profile SP and selects the closest grid point from unselected grid points (S55). According to the example in FIG. 22, the grid point 65 is selected from unselected grid points because the grid point 65 is closest to the input device value (RGB1) for the input point 60c.

The output device value acquirer 54 acquires an output device value for chart generation in terms of the newly selected grid point (S56). The process at step S56 is similar to the process to acquire output device values for chart generation in FIG. 17.

The chart generator 55 determines whether number N is smaller than the number of extracted output device values (S57). The number of extracted output device values is three in the example of FIG. 26. If number N is "1" (YES at S57), number N is smaller than the number of extracted output device values (namely, three in FIG. 26). The chart generator 55 increments N (set to N=2) (S58).

The chart generator 55 proceeds to step S52 and determines whether a color patch can be still added to the paper. The process at steps S53 through S57 is repeated if a color patch can be added (YES at S52). In this case, a color patch can be added to region A2a. The extracted output device value for object Obj5 is used to generate the color patch at region A2a.

At step S57, the chart generator 55 determines whether number N is smaller than the number of extracted output device values (S57). The number of extracted output device values is three in the example of FIG. 26. If number N is "2" (YES at S57), number N is smaller than the number of extracted output device values (namely, three in FIG. 26). The chart generator 55 increments N (set to N=3) (S58) and proceeds to the determination process at step S52.

At step S52, the chart generator 55 completes allocating color patches to regions A1a and A2a, determines that no color patch can be added (NO at S52), and terminates the process.

At step S57, the chart generator 55 determines whether number N is smaller than the number of extracted output device values (S57). If it is determined that number N is smaller than the number of extracted output device values, number N is set to "1" (N=1) and control proceeds to the process at step S52.

For example, it is supposed that the number of extracted output device values is "3" and the number of color patches capable of being added (surplus) is "4." In this case, color patches are added in terms of three extracted output device values from the first to the third (N=1 through 3) (corresponding to S58). A color patch is then added in terms of the first extracted output device value (N=1) again (corresponding to S59).

According to the above-mentioned embodiments, the process determines whether there is an unused position capable of allocating a color patch. A color patch is added if there is an unused position capable of allocating a color patch. In this case, the process adds a grid point closest to the input device value (input point 60c in FIG. 23) except already selected grid points. It is therefore possible to more accurately interpolate the input device value. A color patch is added to an unused position capable of allocating a color patch. It is therefore possible to effectively use color patch allocating regions (corresponding to seven color patches in FIGS. 22 and 27).

According to the embodiments above, the output device value acquirer 54 may be configured to determine whether the sum of output device values for grid points selected by the grid point selector 53 is smaller than or equal to a predetermined value. It is supposed that CMY components of an output device value each take a gradation value ranging from 0 to 255. In this case, the sum of C, M, and Y values is assumed to be 100 as a predetermined value, for example. The sum of output device values for a targeted grid point may be smaller than or equal to the predetermined value. In this case, a grid point other than the selected grid points is added so that the grid point can interpolate an estimated input device value and is closest to the input device value. The process acquires an output device value for chart generation at the added grid point. The scanner profile processor 3c can thereby efficiently generate scanner profile SP by using only the output device value for chart generation at the grid point where a specific color such as R makes a great influence on process colors (such as CMYK).

According to the embodiments above, the scanner profile generator 83 uses scanner profile SP to which a new grid point is added. The scanner profile generator 83 subsequently deletes the new grid point from this scanner profile SP. Discarding the partially generated grid point reduces the required memory area, making it possible to save hardware resources Differently from the above, the scanner profile generator 83 may save a new grid point added to scanner profile SP and related information after using scanner profile SP to which the new grid point is added. Storing the partially generated grid point can reduce a material corresponding to the already generated grid point. Storing the partially generated grid point can also generate scanner profile SP for the entire color gamut.

The embodiments above illustrate CMYK as the process colors for output device values and illustrate RGB as the input device values, but are not limited thereto. For example, the image generator body 10 may include an image formation unit compatible with a color other than the CMYK colors. The color other than the CMYK colors is also applicable to the process colors for output device values. A sensor (image reader) of the scanner 30a may include a color filter (complementary filter) other than RGB. In such a case, the color other than RGB is also applicable as an input device value.

At least one mode of one or more embodiments of the present invention can generate a grid point only for the needed part in a scanner profile and greatly reduce the material consumption.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, the above-mentioned embodiments describe in detail and specifically configurations of the apparatuses and the system in order to explain the present invention for simplicity, but are not limited to an entity including all the configurations that have been described. The configuration of one or more embodiments of the present invention can be partially replaced by the configuration of another embodiment of the present invention. The configuration of one or more embodiments of the present invention can be added to the configuration of another embodiment of the present invention. The configuration of one or more embodiments of the present invention can be partially subject to addition, deletion, or replacement of another configuration.

All or part of the above-mentioned configurations, functions, processors, and processing means may be implemented by designing an integrated circuit as hardware, for example.

The control lines or the information lines are provided on condition that they are considered necessary for the sake of description. The description does not cover all control lines or information lines as products. Actually, almost all the configurations can be connected to each other.

In the present specification, the process steps to describe chronological processes include not only a process chronologically executed in the order of a described sequence, but also a process that may not be always chronologically executed but is executed in parallel or individually (such as a parallel process or an object-based process).

What is claimed is:
1. A printer controller comprising:
 a storage that saves:
  a printer color conversion table that registers correspondence relationship between an output device color space, including a CMYK color space, and a device-independent color space; and
  a scanner color conversion table that registers correspondence relationship between the device-indepen- dent color space and an input device color space, including an RGB color space, and retains a CMYK output device value at a grid point;

a processor connected to the storage and that:
- determines whether a pixel containing CMYK and Red components exists in input image data,
- upon determining that the pixel containing the CMYK and Red components exists, with respect to the pixel containing the CMYK and Red components, refers to the printer color conversion table and the scanner color conversion table to estimate an RGB input device value corresponding to the CMYK output device value,
- selects a plurality of grid points interpolating the estimated input device value from the scanner color conversion table,
- acquires an output device value for color patch by adding information about a Red component for the pixel containing the CMYK and Red components to the CMYK output device value retained at each of the selected grid points, and
- generates a chart image including a color patch based on the output device value for color patch at each of the grid points.

2. The printer controller according to claim 1, wherein the processor refers to a scanner color conversion table corresponding to a K ingredient amount as the scanner color conversion table.

3. The printer controller according to claim 1, wherein the processor selects at least four grid points in an RGB space from the scanner color conversion table as the grid points interpolating the estimated input device value.

4. The printer controller according to claim 1, wherein the processor selects a combination of grid points closest to the input device value from the scanner color conversion table as the grid points interpolating the estimated input device value.

5. The printer controller according to claim 1, wherein when the input image data includes a plurality of pixels including the Red component and accordingly includes a plurality of the output device values, the processor deletes the color patch causing the output device value for color patch to overlap during chart image generation.

6. The printer controller according to claim 1, wherein when the sum of the output device values for the selected grid point is smaller than or equal to a predetermined value, the processor excludes the already selected grid points, adds a grid point interpolating the input device value and being closest to the input device value, and acquires the output device value for color patch for the added grid point.

7. The printer controller according to claim 1, wherein the processor determines whether the number of color patches allocable to paper is surplus to the number of the output device values including the Red component, and
when the number of the color patches allocable to paper is surplus to the number of the output device values including the color other than CMYK, the processor excludes the already selected grid points, adds a grid point from the grid point closest to the input device value, and acquires the output device value for color patch for the added grid point.

8. The printer controller according to claim 1, wherein the processor determines whether the Red component is included in color components of a raster image in one of a job, a page, and a specified region.

9. The printer controller according to claim 1, wherein the processor further:
- acquires an input device value for each color patch read by an image reader from paper to which the chart image is output;
- acquires a color value for each color patch read by a colorimeter from paper to which the chart image is output; and
- generates a new grid point by associating the acquired input device value with the acquired color value, and adds the new grid point to the scanner color conversion table.

10. The printer controller according to claim 9, wherein the processor causes the new grid point to retain an output device value for the chart image in addition to the input device value and the color value.

11. The printer controller according to claim 9, wherein after referring to the generated scanner color conversion table, the processor deletes the new grid point from the scanner color conversion table.

12. The printer controller according to claim 9, after referring to the generated scanner color conversion table, the processor retains the new grid point added to the scanner color conversion table.

13. A color management system comprising;
the printer controller according to claim 1; and
an image generator that forms the chart image generated by the processor on paper.

14. A non-transitory computer-readable recording medium storing a program that causes a computer to execute:
- determines whether a pixel containing CMYK and Red components exists in input image data,
- when determining that the pixel containing the CMYK and Red components exists, with respect to the pixel containing the CMYK and Red components, estimating an RGB input device value corresponding to a CMYK output device value by using a printer color conversion table that registers correspondence relationship between an output device color space including a CMYK color space and a device-independent color space, and a scanner color conversion table that registers correspondence relationship between the device-independent color space and an input device color space including an RGB color space, and retains the CMYK output device value at a grid point;
- selecting a plurality of grid points interpolating the estimated input device value from the scanner color conversion table;
- acquiring an output device value for color patch by adding information about a Red component for the pixel containing the CMYK and Red components to the CMYK output device value retained at each of the selected grid points in the scanner color conversion table; and
- generating a chart image including a color patch based on the output device value for color patch at each of the grid points.

15. A printer controller comprising:
a storage that saves:
- a printer color conversion table that registers correspondence relationship between an output device color space, including a CMYK color space, and a device-independent color space; and a scanner color conversion table that registers correspondence relationship between the device-independent color space and an input device color space, including an RGB color space, and retains a CMYK output device value at a grid point;

a processor connected to the storage and that:

determines whether a pixel containing a color other than CMYK exists in input image data, upon determining that the pixel containing the color other than CMYK exists, refers to the printer color conversion table and the scanner color conversion table to estimate an RGB input device value corresponding to the CMYK output device value in the pixel containing the color other than CMYK, selects a plurality of grid points interpolating the estimated input device value from the scanner color conversion table, acquires an output device value for color patch by adding information about a color except CMYK for the pixel to the CMYK output device value retained at each of the selected grid points, and generates a chart image including a color patch based on the output device value for color patch at each of the grid points, wherein the processor determines, pixel by pixel, whether the pixel containing the color other than CMYK exists in input image data, and when determining that the pixel containing the color other than CMYK does not exist, the processor terminates the processing without estimating the RGB input device value.

* * * * *